United States Patent [19]
Shikaumi et al.

[11] Patent Number: 6,026,248
[45] Date of Patent: Feb. 15, 2000

[54] CAMERA OR APPARATUS ADAPTED TO FILM CARTRIDGE

[75] Inventors: Masao Shikaumi; Toshifumi Ohsawa, both of Tokyo, Japan

[73] Assignee: Canon Kabushiki Kaisha, Tokyo, Japan

[21] Appl. No.: 08/777,425

[22] Filed: Dec. 30, 1996

[30] Foreign Application Priority Data

Jan. 11, 1996 [JP] Japan .................................. 8-019317
Jan. 24, 1996 [JP] Japan .................................. 8-009880
Jan. 31, 1996 [JP] Japan .................................. 8-035772

[51] Int. Cl.$^7$ ....................................................... G03B 7/24
[52] U.S. Cl. ......................... 396/207; 396/208; 396/515
[58] Field of Search ................................. 396/207, 208, 396/124, 515

[56] References Cited

U.S. PATENT DOCUMENTS

| | | | |
|---|---|---|---|
| 3,899,245 | 8/1975 | Bernhardt | 356/124 |
| 4,325,620 | 4/1982 | Holley | 396/515 |
| 4,903,055 | 2/1990 | Lourette et al. | 396/208 |
| 5,440,363 | 8/1995 | Minnick et al. | 396/207 |
| 5,477,286 | 12/1995 | Ohkawa | 396/208 |

*Primary Examiner*—Russell Adams
*Attorney, Agent, or Firm*—Robin, Blecker & Daley

[57] ABSTRACT

An apparatus, such as a camera, comprises a detection device which detects an index of a film cartridge, and a control device which performs predetermined control in accordance with the detection device detecting that the index of the film cartridge does not exist in indices of a recognized film cartridge for photography but is an admitted, predetermined index.

55 Claims, 23 Drawing Sheets

FIG. 2(a) (UNEXPOSED)
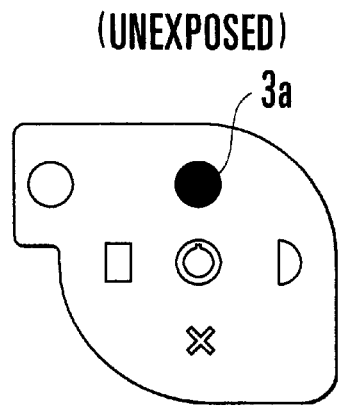
FIG. 2(b) (PARTIALLY EXPOSED)
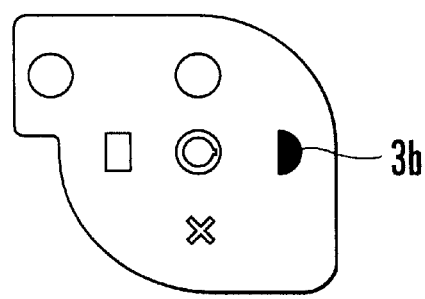
FIG. 2(c) (EXPOSED)
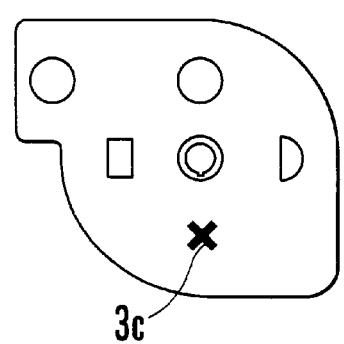
FIG. 2(d) (DEVELOPED)
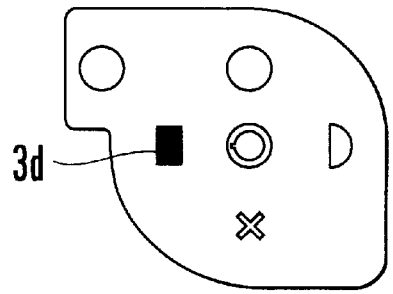

F I G. 10 (a)
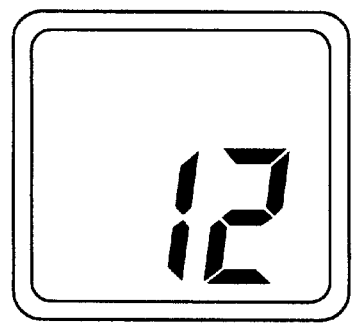
F I G. 10 (b)
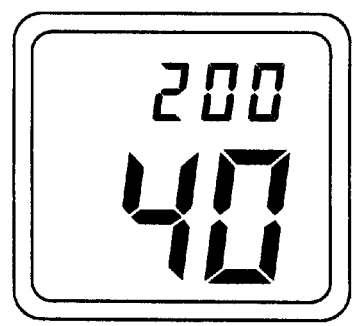
F I G. 10 (c)
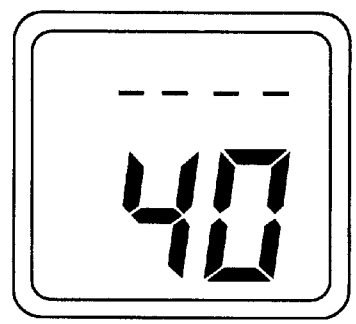
F I G. 10 (d)
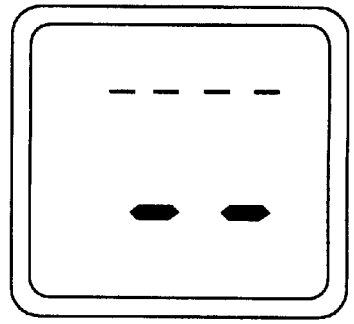

FIG. 11(a) (UNEXPOSED)
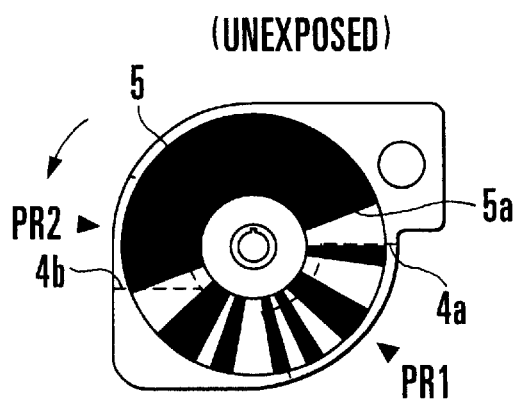
FIG. 11(b) (PARTIALLY EXPOSED)
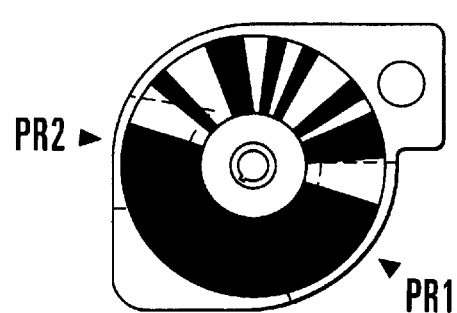
FIG. 11(c) (EXPOSED)
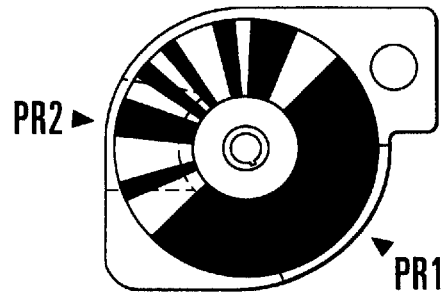
FIG. 11(d) (DEVELOPED)
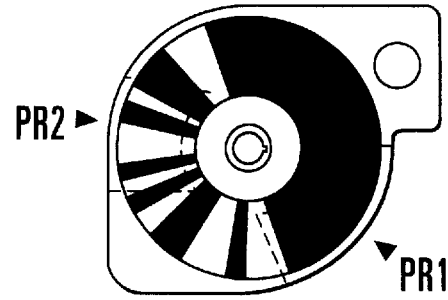

FIG. 24

| CODE | | | NUMBER-OF-FRAMES INFORMATION |
|---|---|---|---|
| b2 | b1 | b0 | |
| 0 | 0 | 0 | 10 |
| 0 | 0 | 1 | 12 |
| 0 | 1 | 0 | 20 |
| 0 | 1 | 1 | 24 |
| 1 | 0 | 0 | VACANT |
| 1 | 0 | 1 | 36 |
| 1 | 1 | 0 | VACANT |
| 1 | 1 | 1 | NONEXISTENT |

FIG. 25

| CODE | | | FILM SENSITIVITY INFORMATION |
|---|---|---|---|
| b5 | b4 | b3 | |
| 0 | 0 | 0 | 25 |
| 0 | 0 | 1 | 50 |
| 0 | 1 | 0 | 64 |
| 0 | 1 | 1 | 100 |
| 1 | 0 | 0 | 200 |
| 1 | 0 | 1 | 400 |
| 1 | 1 | 0 | VACANT |
| 1 | 1 | 1 | NONEXISTENT |

CAMERA OR APPARATUS ADAPTED TO FILM CARTRIDGE

BACKGROUND OF THE INVENTION

1. Field of the Invention

This invention relates to an apparatus such as a camera applicable to film cartridges of various kinds.

2. Description of Related Art

A camera disclosed in Japanese Laid-Open Patent Application No. SHO 55-22799 is arranged to use a film cartridge having information about the film recorded as magnetic information on a disk which moves integrally with the film in association with transportation of the film and to read the information when the film is supplied to the camera. Meanwhile, Japanese Laid-Open Utility Model Application No. SHO 58-183695 discloses a cassette tape arranged to record information about the cassette tape in a bar code on a tape take-up reel of the cassette tape. It is possible to have the above-stated film information recorded also in a bar code on the disk in the same manner. The film information then can be automatically set by arranging the camera to read the film information by optical means such as a photo-reflector or the like at the commencement of film transportation.

Further, Japanese Laid-Open Patent Application No. HEI 2-114248 discloses a film cartridge arranged to indicate whether the film contained therein has not been used, i.e., has been unexposed, or has been used, i.e., has been exposed, by an indication means which rotates along with the rotation of a supply spool disposed within the film cartridge. A camera adopted for this film cartridge is arranged to detect the indication made by the indication means, so that a double exposure is avoidable even where the camera is loaded with a photographed (used) film, i.e., an exposed film. In order to let such double exposure preventing means effectively function, the camera must be arranged to set the indication means in such a position to show the completely used (exposed) state of the film after completion of photographing on all frames of the film. The cameras arranged in this manner are disclosed, for example, in Japanese laid-open patent applications No. HEI 4-301829 and No. HEI 4-366933, etc.

There have been developed various methods for automation of camera operations, including an automatic film loading operation which simplifies the conventional film loading. Unlike the conventional manner in which the camera operator is required to manually set a leader part of film in a predetermined position by pulling it out from the film cartridge, the leader part of the film is arranged to be automatically pulled into the camera by means of a motor or the like when the film cartridge is simply set in a predetermined position within the camera.

In showing the automatic film loading function of a camera to a likely buyer by demonstrating it at a camera store (or shop), the camera must be actually loaded with a film cartridge. However, use of a film cartridge containing an unexposed film therein for a demonstration would cause a useless shot or shots to ruin the film in part after loading. Besides, when the useless shots are taken to the last frame portion of the film, the film is automatically rewound. In such a case, the film cartridge would come to inhibit further photographing. Such a demonstration is uneconomical.

To solve this problem, a camera disclosed in Japanese Laid-Open Utility Model Application No. SHO 60-172141 is arranged to have a demonstration mode for showing the functions and the method for operating the camera. The camera disclosed in this utility model application necessitates an operation on a switch in selecting the demonstration mode. However, the switching operation tends to be erroneously performed by the operator and is, therefore, not desirable.

It has been also developed to arrange an empty film cartridge having no film therein to be used for demonstrations at a camera store. Hereinafter, such a film cartridge will be called a demonstration film cartridge. The demonstration film cartridge is arranged to be distinguishable from a normal film cartridge by means of the bar code information mentioned above.

It has been practiced to arrange a camera to position the film, with a film cartridge placed within the camera, by detecting perforations provided in the film in carrying out various actions such as an automatic loading action by automatically moving the film to a photographable position, a one-frame winding action after a shutter release action, a film rewinding action and. When there is no film cartridge within the camera, an abnormal camera action is prevented, for example, by not performing any film transporting action with the absence of a film cartridge detected or by inhibiting the film perforation detecting action. However, in the case of the above-stated demonstration film cartridge, no film is contained in the film cartridge when the camera is loaded with the film cartridge. It is impossible for the camera to immediately detect the absence of film. As a result, the camera makes an autodiagnosis to decide that the camera is out of order as no perforation is detectable during the process of its film transporting action.

Further, the above-stated arrangement for indicating the exposure state of the film comes to show an "exposed" state after completion of photographing for all the frames of the film and to prevent any double exposure even if the same film is loaded on a camera again. However, the double exposure inhibiting arrangement is inconvenient in the case of the demonstration film cartridge, because the demonstration film cartridge is to be repeatedly used at a store. Bringing the setting of "exposed" state back to the initial setting of "unexposed" state necessitates use of a special tool, which prevents ordinary camera operators from easily changing the set state of a film. However, it is not easy to have such a special tool ready for use at every camera store.

An arrangement for rendering such a photographed (exposed) film usable by setting some mode in the process of manufacture at a factory or the like is disclosed in Japanese Laid-Open Patent Application No. HEI 7-295067. According to that disclosure, the contents of a nonvolatile storage element such as an EEPROM or the like are rewritten to bring forth a predetermined mode. However, it is difficult to set such a mode at a camera store.

The indication of the exposure state of film mentioned above is arranged in general to be set upon completion of film rewinding as the indicating part rotates along with the film supply spool. In the case of the demonstration film cartridge, however, the film cartridge can be taken out to the outside without film rewinding, because the film cartridge contains no film. Therefore, the exposure state indication tends to be not set as expected, because of no film rewinding action.

Another problem with the prior art arrangement lies in that, if film sensitivity is set at a low (ISO) value at the time of demonstration at a camera store, the flash device of the camera tends to flash, thereby increasing the electric energy consumption of a battery of the camera.

A further problem of the prior art arrangement lies in that, once a camera is loaded with a film cartridge, it is difficult to make a discrimination between an ordinary film cartridge and the demonstration film cartridge.

BRIEF SUMMARY OF THE INVENTION

It is one aspect of this invention to provide an apparatus, such as a camera, comprising a detection device which detects an index of a film cartridge, and a control device which performs predetermined control in accordance with the detection device detecting that the index of the film cartridge does not exist in indices of a recognized film cartridge for photography but is an admitted, predetermined index, so that the apparatus is capable of adequately operating in cases where a film cartridge which differs from a normal film cartridge, such as a demonstration film cartridge, is in the apparatus.

The above and other aspects and features of this invention will become apparent from the following detailed description of embodiments thereof taken in conjunction with the accompanying drawings.

BRIEF DESCRIPTION OF THE SEVERAL VIEWS OF THE DRAWING

FIGS. 2(a) to 2(d) show the various manners of an indication made according to the film exposure state of the film cartridge shown in FIG. 1.

FIGS. 10(a) to 10(d) show the various display states of information on an ISO film sensitivity value and a number of film frames in the embodiment of this invention.

FIGS. 11(a) to 11(d) show the various manners of the exposure state indication made on the film cartridge in relation to the position of the bar code disk.

FIG. 24 shows a data conversion table to be used in accordance with the embodiment of this invention.

FIG. 25 shows another data conversion table to be used in accordance with the embodiment of this invention.

DETAILED DESCRIPTION OF THE INVENTION

Preferred embodiments of this invention are described below in detail with reference to the drawings.

Figure 1:
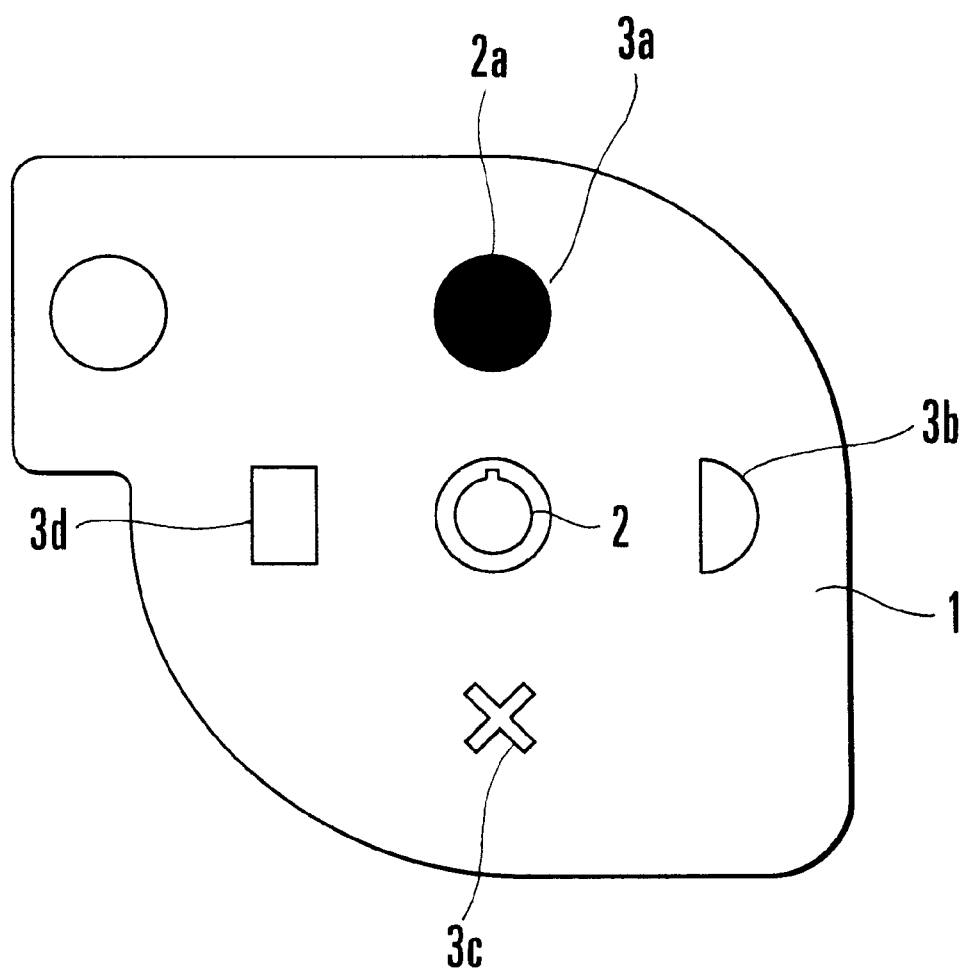
FIG. 1 is a top plan view showing a film cartridge usable for a camera according to an embodiment of this invention.

FIG. 1 is a top view showing a film cartridge to be used for a camera according to an embodiment of this invention. Referring to FIG. 1, the illustration includes a film cartridge 1, a supply spool 2 of the film cartridge 1, and indication windows 3a, 3b, 3c and 3d provided for showing the state of exposure of a film contained within the film cartridge 1. An index 2a is arranged to rotate together with the supply spool 2 and to make an indication through one of the indication windows 3a, 3b, 3c and 3d according to a position where the supply spool 2 comes to a stop.

The indication windows 3a, 3b, 3c and 3d are arranged in such different shapes that enable the camera operator to easily find the exposure state of the film.

FIGS. 2(a) to 2(d) show different cases where the index 2a is shown respectively at the indication windows 3a, 3b, 3c and 3d. The index 2a is shown at the indication window 3a in the case of FIG. 2(a) to indicate that the film is in an "unexposed" state. The index 2a is shown at the indication window 3b in the case of FIG. 2(b) to indicate a "partially exposed" state of the film. The index 2a is shown at the indication window 3c in the case of FIG. 2(c) to indicate an "exposed" state of the film. The index 2a is shown at the indication window 3d in the case of FIG. 2(d) to indicate a "developed" state of the film. In the case of FIG. 1, the index 2a is shown at the indication window 3a to indicate that the film in the film cartridge 1 is in the "unexposed" state.

Figure 3:
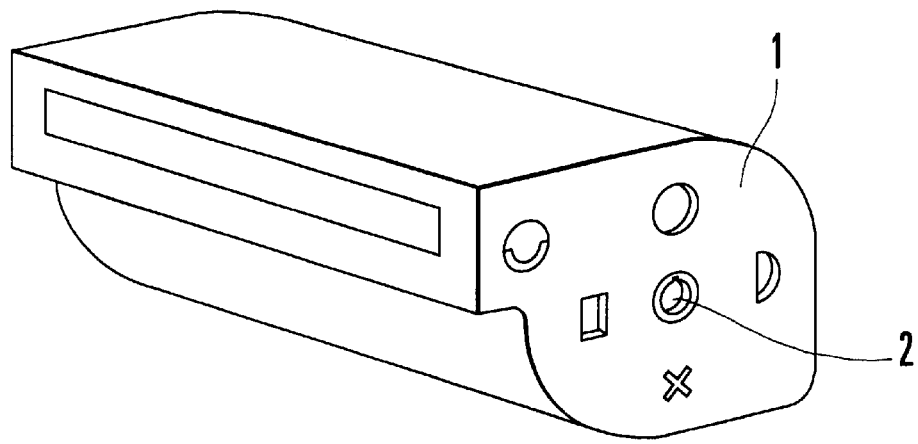
FIG. 3 is a perspective view showing the film cartridge of FIG. 1.
Figure 4:
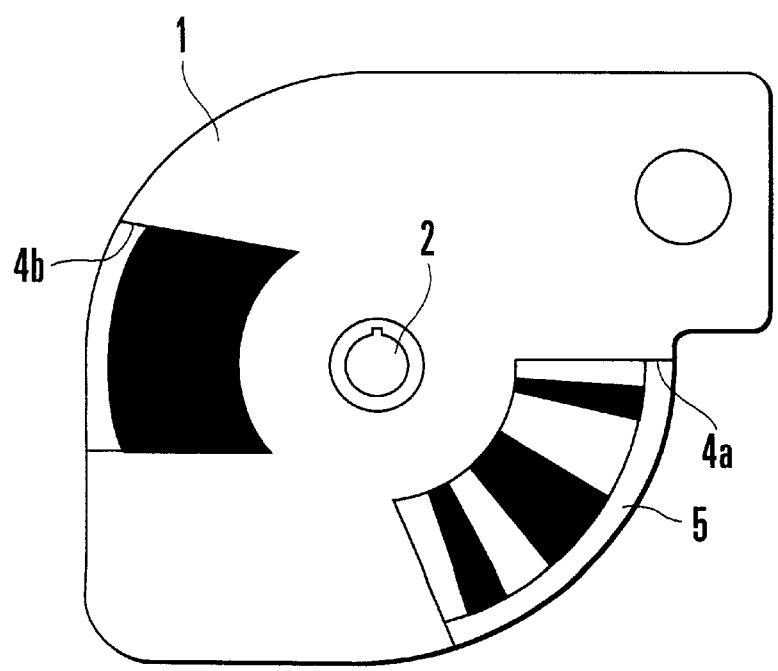
FIG. 4 is a bottom plan view of the film cartridge of FIG. 1.

FIG. 3 shows the above-stated film cartridge 1 in a perspective view. FIG. 4 is a bottom plan view showing the same film cartridge 1. As shown in FIG. 4, there are provided cutout parts 4a and 4b in the bottom side of the film cartridge 1. A bar code disk 5 which is arranged to act together with the supply spool 2 is exposed to the outside through the cutout parts 4a and 4b.

Figure 5:
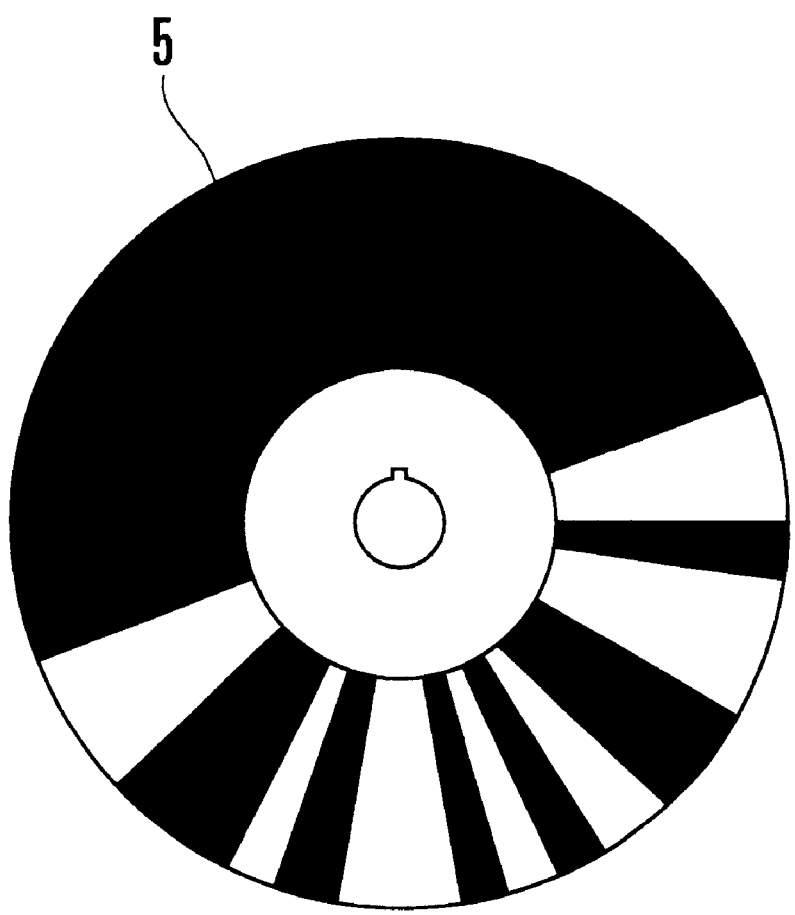
FIG. 5 is a plan view showing a bar code disk provided on the film cartridge of FIG. 1.

FIG. 5 shows the shape of the above-stated bar code disk 5. Bright and dark bar codes are arranged in an area covering nearly one half of the circumference of the bar code disk 5. Both the bright and dark bar codes include wide and thin bars. Information on matters relative to the film, such as the number of film frames and an ISO film sensitivity value and information on the kind of the film, such as whether it is a negative or positive or whether it is a color film or a black-and-white film, are recorded on the bar code disk 5 by combining these wide and thin bars. The bar code information can be optically read through the cutout parts 4a and 4b shown in FIG. 4.

The records provided on the bar code disk 5 also include information as to whether the film cartridge 1 is a demonstration film cartridge or not. This information may be recorded there, for example, by using a part of the bar code disk showing the ISO sensitivity value of the film in the following manner. The bar code may be arranged to show an ISO value "25" if it indicates "1", an ISO value "50" if it indicates "2", an ISO value "100" if it indicates "3" and so forth, and also to show that the film cartridge is a demonstration film cartridge arranged to be used for demonstrations if it indicates "0".

The arrangement for recording information to show that the film cartridge is a demonstration film cartridge at the bar code disk part may be changed to include, in the bar code information, some specific bits indicating that the film cartridge is a demonstration film cartridge. Further, since no film is contained in the demonstration film cartridge, a number-of-frames indicating part of the bar code disk, instead of the ISO-sensitivity indicating part, may be arranged to include specific bits which are arranged to indicate the demonstration film cartridge.

A remaining part of the bar code disk 5 nearly covering the other half of the circumference of the disk 5 and not having any bar code recorded there is arranged to be used for detecting a reference position in reading the bar code information and also for positioning the supply spool 2 in indicating the exposure state of the film by means of the index 2a.

Figure 6:
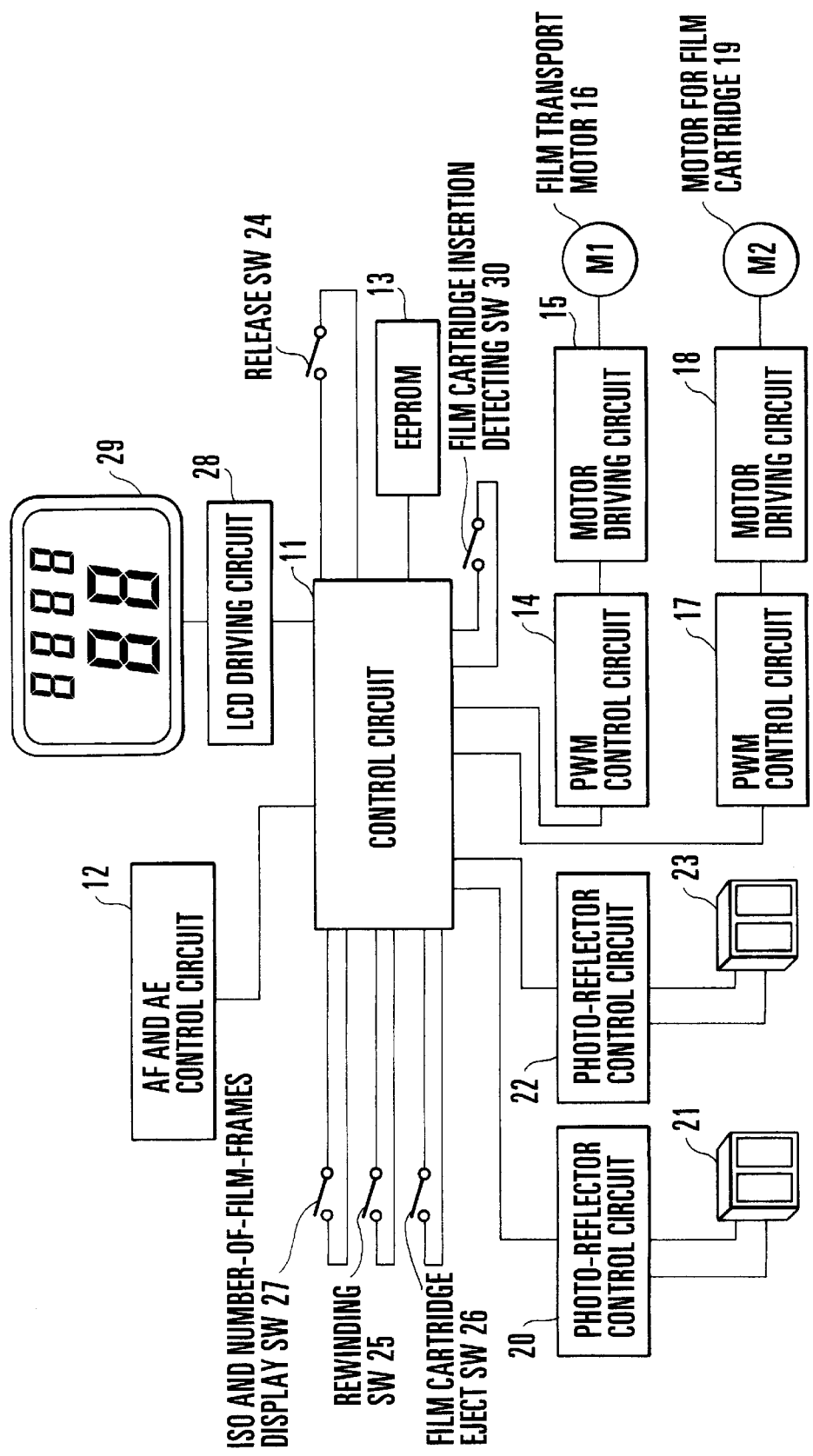
FIG. 6 is a block diagram showing in outline an electrical arrangement of the camera which is arranged as the embodiment of this invention.

FIG. 6 is a block diagram showing in outline the arrangement of the camera arranged as the embodiment of this invention. Referring to FIG. 6, a control circuit 11 which is composed of a microcomputer or the like is arranged to control the actions of the whole camera and to include a register, a RAM, a ROM, etc. An AF and AE control circuit 12 includes a distance measuring circuit which measures a distance from the camera to an object to be photographed and a light measuring circuit. The AF and AE control circuit 12 is thus arranged to open and close a shutter in such a way as to control an exposure action on the film according to the result of a focusing action on a photo-taking lens (not shown) and the luminance of an object to be photographed. An EEPROM 13 which is a nonvolatile writable memory is arranged to be used for writing some adjustment data during a manufacturing process and for recording information about a film counter and an operating state while the camera is in operation. PWM control circuits 14 and 17 are arranged to generate a pulse width modulation (abbreviated to PWM) signal for equivalently controlling a motor current by means of a pulse width obtained when the signal is in an on-state. The duty ratio of the PWM signal is variable by an instruction from the control circuit 11. Reference numerals 15 and 18 denote motor driving circuits. A film transport motor 16 is arranged to perform feeding and rewinding actions on the film. A film cartridge motor 19 is arranged to be used in loading and unloading the film cartridge 1.

The motor driving circuit 15 is arranged to control the rotation of the film transport motor 16 in accordance with the PWM signal from the PWM control circuit 14. The motor driving circuit 18 is arranged to control the rotation of the film cartridge motor 19 also in accordance with the PWM signal from the PWM control circuit 17. The operating speed of the film transport motor 16 and that of the film cartridge motor 19 can be changed by changing the duty ratio of the PWM signal.

Photo-reflector control circuits 20 and 22 are arranged to control respectively photo-reflectors 21 and 23 which are provided for reading bar code information from the bar code disk 5.

The photo-reflector control circuit 20 is arranged to cause the photo-reflector 21 to project an infrared light onto the bar code disk 5 of the film cartridge 1 while the bar code disk 5 is rotating, to detect a reflection light of the projected infrared light, and to obtain a bright-and-dark binary signal from the bar code signal of the bar code disk 5 by comparing the level of detection of the reflection light with an apposite level. The other photo-reflector control circuit 22 is arranged to cause the photo-reflector 23 to act in a manner similar to the action of the photo-reflector 21. While the photo-reflector 21 is arranged to detect the bar code signal from the bar code disk 5 through the cutout part 4a of the film cartridge 1, the other photo-reflector 23 is arranged to detect the bar code signal from the bar code disk 5 through the other cutout part 4b of the film cartridge 1.

A release switch 24 is arranged to initiate a release action of the camera when the release switch 24 is manually turned on. A rewinding switch 25 is arranged to initiate a film rewinding action when it is turned on. A film cartridge eject switch 26 is arranged to cause the film cartridge 1 to be ejected from the camera when the eject switch 26 is operated after completion of film rewinding. An ISO sensitivity and number-of-frames display switch 27 is arranged to cause a liquid crystal display (LCD) device 29 which is provided as an external display to make a display showing an ISO sensitivity value of the film and a maximum number of photographable frames of the film, as long as this switch 27 remains in its on-state. An LCD driving circuit 28 is arranged to drive the above-stated LCD device 29 according to a display signal coming from the control circuit 11.

The LCD device 29 normally displays film counter information showing the position of a currently photographable frame position of the film. As mentioned above, the maximum number of photographable frames of the film contained in the film cartridge 1 is on display in place of the film counter information, along with the ISO sensitivity information, as long as the ISO sensitivity and number-of-frames display switch 27 is being operated.

A film cartridge insertion detecting switch 30 is arranged to find whether or not the film cartridge 1 is inserted into a film cartridge chamber of the camera.

Operation of the control circuit 11 is next described below with reference to FIGS. 7, 8 and 9 which are flow charts. In the case of this embodiment, the camera is arranged to automatically pull and eject the film cartridge 1 into and out of the film cartridge chamber.

Figure 7:
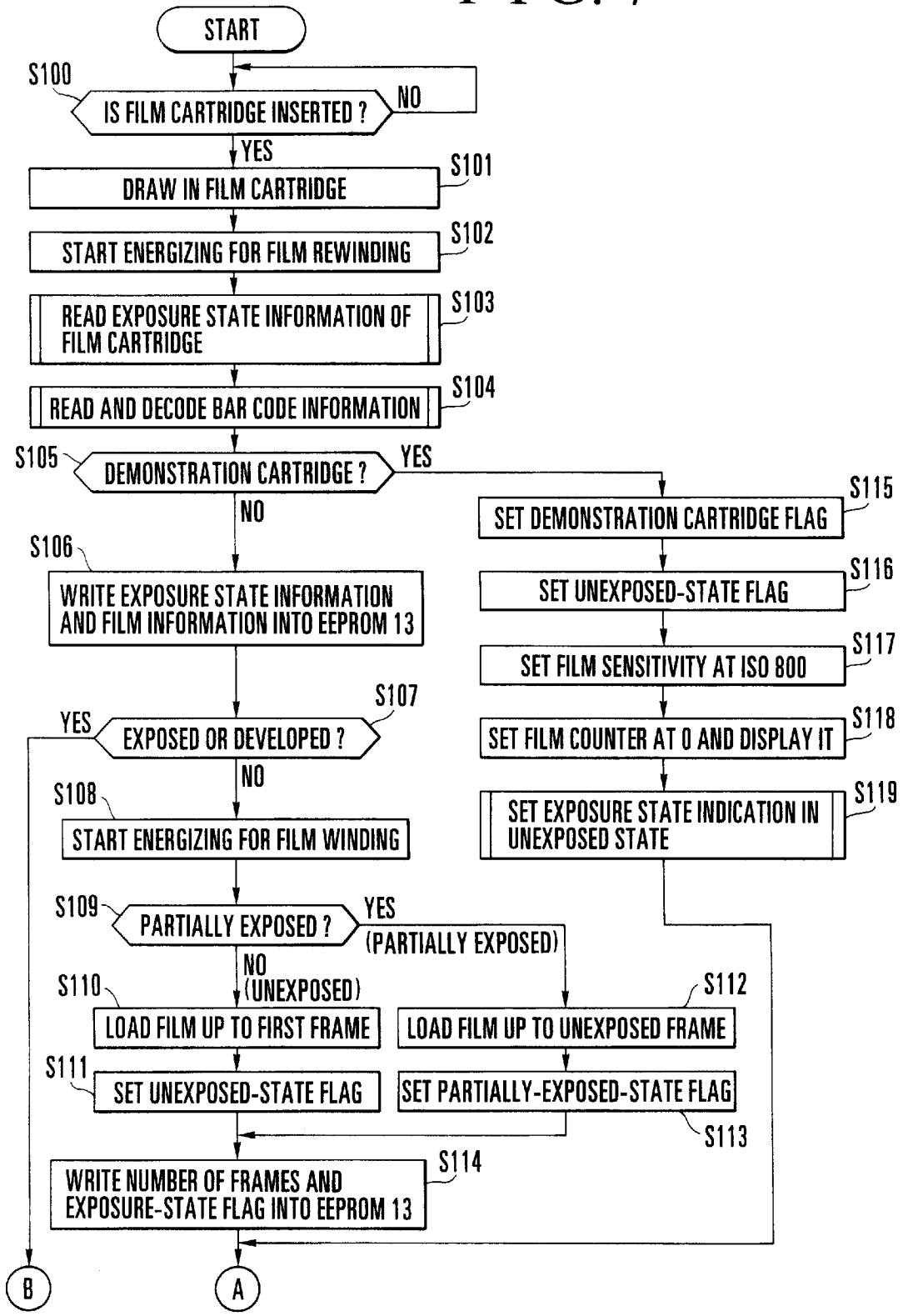
FIG. 7 is a flow chart showing in part an operation of a control circuit shown in FIG. 6.

In FIG. 7, a part from a step S100 through a step S114 relates to actions to be performed during a period from insertion of the film cartridge 1 until completion of film loading (a blank feeding action on the film).

At the step S100, the cartridge insertion detecting switch 30 is checked for insertion of the film cartridge 1 into the cartridge chamber of the camera. The step S100 is repeated until the film cartridge 1 is found to have been inserted. The flow of operation proceeds to a step S101 when the film cartridge 1 is found to have been inserted.

At the step S101, with the film cartridge 1 inserted to a predetermined position, the film cartridge motor 19 is driven through the PWM control circuit 17 and the motor driving circuit 18 to act to pull the film cartridge 1 further into the cartridge chamber. The flow then proceeds to a step S102.

At the step S102, upon completion of pulling the film cartridge into the cartridge chamber, the film transport motor 16 is caused through the PWM control circuit 14 and the motor driving circuit 15 to act in the direction of rewinding the film in such a way as to rotate the bar code disk 5 provided on the film cartridge 1. The flow then proceeds to a step S103.

At the step S103, information on the exposure state of the film cartridge 1 is read to find one of the states as shown in FIGS. 2(a) to 2(d). For reading this information, the photo-reflector control circuits 20 and 22 are caused to drive the photo-reflectors 21 and 23 simultaneously with the rotation of the bar code disk 5. The information is obtained by finding which of the bar code signals is obtained by the photo-reflectors 21 and 23 in the initial stage of rotation of the bar code disk 5. This step is executed to find an angular position at which the bar code disk 5 has been at rest when the film cartridge 1 is loaded. The method for finding the angular position will be described in detail later. Upon completion of reading the exposure information about the film cartridge 1, the flow proceeds to a step S104.

At the step S104, the bar code information on the bar code disk 5 is read out and decoded. The photo-reflector control circuits 20 and 22 and the photo-reflectors 21 and 23 are used in reading the bar code information. The dark part extending about one half of the circumference of the bar code disk 5 is detected. Then, using the dark part detected as a reference part, a bright-and-dark pattern obtained through a bright signal coming next to the dark part is considered to be the bar code information. A decoding action on the bar code information gives information on the number of frames of the film, the ISO sensitivity of the film, the kind of the film and whether the film cartridge is a demonstration film cartridge which is prepared solely for demonstrations.

At a step S105, a check is made to find if the film cartridge inserted in the camera is a demonstration film cartridge on the basis of the decoded bar code information. If so, the flow of operation proceeds to a step S115. If not, that is, if it is found to be a normal film cartridge, the flow proceeds to a step S106.

In this instance, assuming that a normal film cartridge is loaded in the camera, the flow of operation proceeds to the step S106.

At the step S106, the information on the exposure state of the film cartridge 1 and the information on an ISO sensitivity value of the film, the kind of the film, etc., read at the step S103 are written into the EEPROM 13. This step is provided, because the information on the exposure state of the film cartridge 1 cannot be obtained unless the bar code disk 5 is rotated. After the exposure state information is once obtained, the information is stored in the EEPROM 13 which is a nonvolatile storage element, so that the information can be retained, for example, even after the battery of the camera is replaced due to a drop in its voltage. Unlike the indication of the exposure state information, the information on the number of frames of the film, the ISO sensitivity value of the film, etc., can be obtained by reading the bar codes not only when the film cartridge is inserted. However, after film loading, the bar codes occasionally become not freely readable. For example, the bar codes are not readable while the film is being moved to a frame position. In view of this, in addition to the necessity of replacing the battery, the information on these matters is also stored in the nonvolatile storage of the EEPROM 13. The flow then proceeds to a step S107.

At the step S107, a check is made to find if the information on the exposure state of the film cartridge 1 read out at the step S103 indicates an exposed state or a developed state. It is impossible to use a film of the exposed or developed state for photographing with the camera. If the film cartridge 1 inserted into the camera is found to be either in the exposed or developed state, therefore, the flow of operation proceeds to a step S133 shown in FIG. 8 without performing any film loading action nor any photographing action thereafter. If the film cartridge 1 is found to be in the unexposed state or in the partially exposed state, on the other hand, the flow of operation proceeds to a step S108.

The film loading action is allowed to be carried out with the flow of operation having proceeded to the step S108. Therefore, at the step S108, the supply of film rewinding power which has been applied to the film transport motor 16 for the steps from S102 through S107 is brought to a stop. Then, for moving the film out from the film cartridge 1, the film transport motor 16 is caused through the PWM control circuit 14 and the motor driving circuit 15 to rotate in the direction of winding the film. The flow then proceeds to a step S109.

At the step S109, a check is made to find if the exposure state of the film cartridge 1 read at the step S103 indicates the partially exposed state. If not, that is, if it indicates the unexposed state, the flow proceeds to a step S110.

At the step S110, a film loading action is carried out until a first frame portion of the film is set in a photographable position. Upon completion of the film loading action, the supply of power in the direction of winding the film is brought to a stop. Then, the LCD device 29 is caused to display a value "1" at a film counter part thereof.

At the next step S111, a flag which indicates that the film cartridge 1 loaded in the camera is in the unexposed state is set in a RAM within the control circuit 11. The flow then proceeds to a step S114.

If the film cartridge 1 loaded in the camera is found at the step S109 to be in the partially exposed state, the flow of operation proceeds to a step S112.

At the step S112, the film loading action is performed until an unexposed frame is detected. An unexposed frame is detectable, for example, by detecting the presence or absence of a magnetic record on the surface of the film. The film has a magnetic substance applied to its surface and is thus arranged to have information of various kinds recorded there at every photographed frame at the time of photographing. Since unexposed frames have no magnetic record of such information there, each unexposed frame can be discriminated from exposed frames by detecting the presence or absence of the magnetic record. With the film loading action performed until the first unexposed frame is set in the photographable position, the film loading action is brought to an end by stopping the supply of power in the film winding direction. Then, the frame number of this unexposed frame is displayed at the film counter part of the LCD device 29. The flow of operation then proceeds to a step S113.

At the step S113, a flag which indicates that the film cartridge 1 loaded is in the partially exposed state is set in the internal RAM. The flow of operation then proceeds to a step 114.

At the step S114, information on the number of currently set frames after completion of the film loading action and a flag showing the exposure state of the film cartridge 1 is stored in the EEPROM 13.

The action of film loading is completed by the processes described above. After the film loading action, the flow of operation proceeds to steps S120 to S122 of FIG. 9 for photographing and film rewinding actions.

If the film cartridge 1 inserted is found to be a demonstration film cartridge at the step S105, the flow proceeds from the step S105 to a step S115.

At the step S115, a demonstration film cartridge flag which indicates use of a demonstration film cartridge is set in the internal RAM before the flow proceeds to a step S116. The flag thus set in the RAM is used as a reference at steps S124, S129, etc., later on in deciding the inserted film cartridge 1 to be or not to be a demonstration film cartridge.

At the step S116, a flag indicating that the inserted film cartridge is in the unexposed state is set in the internal RAM and the flow proceeds to a step S117. In the case of a demonstration film cartridge, the control circuit 11 thus internally treats the cartridge as in the unexposed state irrespective of any exposure state indication shown on the inserted film cartridge 1.

At the step S117, with the camera loaded with a demonstration film cartridge, the camera is assumed to be loaded with a film of an ISO sensitivity value of 800 and film sensitivity data to be used for photographing at a step S123 is set at the value of ISO 800 . In the case of this embodiment, the demonstration film cartridge is assumed to have information showing it as a demonstration film cartridge stored at the bar code part where a film sensitivity value is supposed to be indicated. In other words, the demonstration film cartridge does not carry any film sensitivity information thereon. The reason for treating the demonstration film cartridge as containing a film of sensitivity of ISO 800 is as follows. Flashing by a flash device can be suppressed by setting the film sensitivity value at a value which is higher than film sensitivity values which are frequently used (ISO 100 to ISO 400), so that the consumption of the battery of the camera can be minimized. After the step S117, the flow proceeds to a step S118.

At the step S118, "0" is displayed at the film counter part of the LCD device 29. Since no film is contained in the demonstration film cartridge, the film counter display always shows "0" when the camera is loaded with the demonstration film cartridge.

At a step S119, an indication of the exposure state of film is set. The details of the exposure state indication setting action will be described later. Since the unexposed-state flag has been set by the step S116, the exposure state indication is set in the unexposed state at the step S119. The flow then proceeds to steps S120 to S122 which are shown in FIG. 9 and to be executed for photographing and rewinding actions.

In the case of a demonstration film cartridge, the exposure state indication is set as "unexposed" for the following reason. As will be described later herein, no film rewinding action is performed as no film is contained in the demonstration film cartridge. In this case, even if a photographing action is performed, the exposure state indication does not change from the "unexposed" state to the "partially exposed" state nor to the "exposed" state. Hence, the exposure state indication can be set at the step S119. Besides, setting the exposure state indication by this step obviates the necessity of setting the exposure state again at the time of ejecting the cartridge, so that the provision of this step improves the operability of the demonstration film cartridge.

Figure 8:
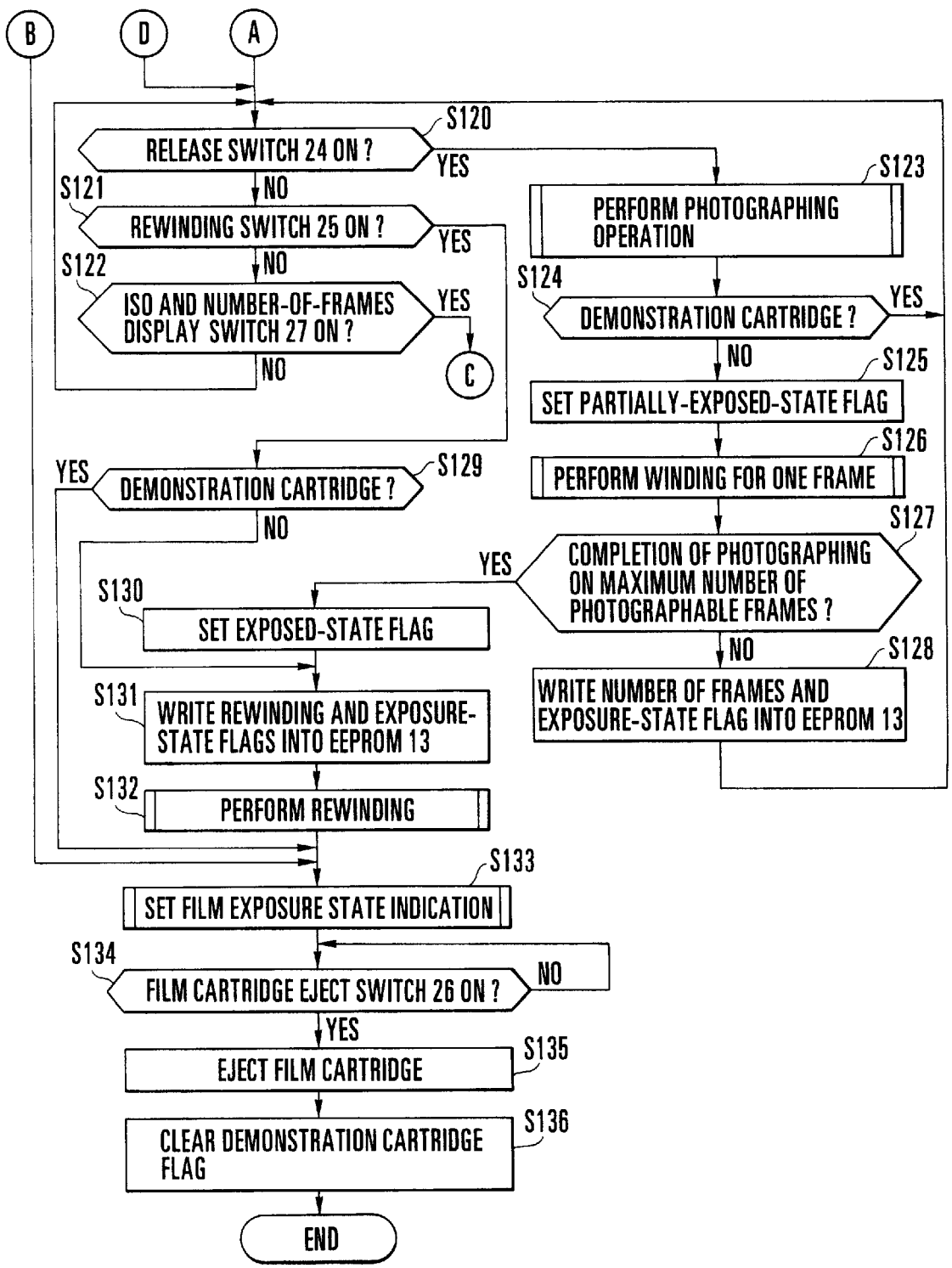
FIG. 8 is a flow chart showing the operation of the control circuit as continuing from a flow of FIG. 7.

Steps S120 to S122 shown in FIG. 8 are provided for awaiting operations to be performed by the operator of the camera.

At the step S120, a check is made to find if the release switch 24 is pushed. If not, the flow proceeds to the step S121.

At the step S121, a check is made to find if the rewinding switch 25 is operated. If so, the flow proceeds to a step S129. If not, the flow proceeds to a next step S122.

At the step S122, a check is made to find if the ISO sensitivity and number-of-film-frames display switch 27 is turned on. If so, the flow proceeds to a step S150. If not, the flow returns to the step S120 to repeat the steps S120, S121 and S122.

When the release switch 24 is found to be pushed at the step S120, the flow proceeds to a step S123 to perform actions relative to photographing at steps S123 to S128.

At the step S123, the AF and AE control circuit 12 is controlled to carry out known photographing actions such as distance and light measuring actions, a flash device charging action, a focusing action, a shutter control action and a flash control action.

At the step S124, a check is made for the flag of the demonstration film cartridge on the internal RAM to find if the film cartridge currently inserted is a demonstration film cartridge. If so, the flow instantly returns to the step S120 as film transporting action is not required. In the case of a demonstration film cartridge, therefore, a film winding action to be performed at a step S126 as described later is not performed and the display at the film counter part remains at "0". Further, since other steps S125 and S130 are also not executed in this instance, the exposure state indication remains unchanged from the "unexposed" state. If the film cartridge currently inserted is not a demonstration film cartridge, the flow proceeds to steps S125 to S128.

At the step S125, a flag which indicates that the film cartridge inserted is in the partially exposed state is set in the internal RAM. With the partially-exposed-state flag set, the exposure state of the film changes from the unexposed state to the partially exposed state even if only one frame is used for photographing.

At the step S126, a one-frame winding action is performed on the film. Then, information on various matters such as the data of the shot taken, use or nonuse of the flash device, the magnifying rate of the shot, a focal length, an aperture value, a shutter speed, luminance of the scene of the shot, whether the shot is taken under a rear-light condition or not are magnetically recorded on the film surface. After completion of the one-frame film winding action, the flow proceeds to the step S127.

At the step S127, a check is made to find if all the maximum number of frames of the film loaded on the camera have been used for photographing. This check either may be made on the basis of information on the number of frames of the film read at the step S104 or may be made by detecting a mark indicating the end of the film during the process of film winding at the step S126. It is also possible to make this check by detecting in a known manner a tightly stretched state arising while the film is being transported. If it is found that the maximum number of frames have not been completely used for photographing as yet, the flow of operation proceeds to the step S128.

At the step S128, since not all the maximum number of frames have been used for photographing as yet, a new frame number is set at a counter disposed within the control circuit 11. The LCD device 29 is caused to display the number through the LCD driving circuit 28. Frame number information and an exposure-state flag (a partially-exposed-state flag in this case) are written into the EEPROM 13. After the step S128, the flow returns to the step S120 to wait again for an operation on the release switch 24 or an operation on the rewinding switch 25 or on the ISO sensitivity and number-of-film-frames display switch 27.

When all the maximum number of frames are found to have been used for photographing at the step S127, the flow proceeds to a step S130.

At the step S130, since all the frames have been used for photographing, a flag indicating that the film cartridge in the camera is in the exposed state is set in the internal RAM. The flow then proceeds to a step S131.

When the rewinding switch 25 is found at the step S121 to have been operated, the flow proceeds to the step S129 as mentioned above.

At the step S129, a check is made for the flag of a demonstration film cartridge on the internal RAM to find if the film cartridge inserted is a demonstration film cartridge. If so, the flow proceeds to a step S133, skipping the film rewinding action, etc., of a step S132, as no film is contained in the film cartridge. If not, the flow proceeds to a step S131.

In cases where all the maximum number of frames are found to have been used for photographing (at the step S127) or where the rewinding switch 25 is operated and the film cartridge in the camera is found to be not a demonstration film cartridge (step S121→step S129, NO), the flow proceeds to the step S131 as mentioned above.

At the step S131, flags indicating a film rewinding state and the exposure state of the film are stored in the EEPROM 13, for the following reason. In cases where the power supply of the camera happens to be reset while the film rewinding action is yet in process, it is necessary, for resumption of the film rewinding action, to have information indicating that the film rewinding process still remains unfinished stored in a nonvolatile storage element. The flow then proceeds to a step S132 for the film rewinding action.

At the step S132, the film rewinding action is carried out by causing, through the PWM control circuit 14 and the motor driving circuit 15, the film transport motor 16 to act in the film rewinding direction. The end of the film rewinding action is detectable by finding completion of rewinding the film back into its cartridge in a known manner. For example, it can be found through a signal inputted by the operator or some input means (not shown), the lapse of a period of time necessary in rewinding the film, detection of movement of the film by a photoelectric conversion element or the like, etc. After film rewinding, the flow proceeds to a step S133.

When the rewinding action on the film has been completed (S132) or when the film cartridge 1 in the exposed state or the developed state is inserted in the camera (YES of step S107), the flow of operation proceeds to the step S133 as mentioned above.

At the step S133, the indication of state of film exposure is set. The setting action on the film exposure state indication will be described in detail later herein. After completion of the setting action on the film exposure state indication, the flow proceeds to a step S134.

At the step S134, a check is made to find if the film cartridge eject switch 26 has come to turn on. The step S134 is repeated until the eject switch 26 comes to turn on. Since the state of the release switch 24 is not detected at this step, a release action is inhibited from being performed when the film cartridge 1 is loaded on the camera in a completely rewound state or in the exposed state. When the film cartridge eject switch 26 turns on, the flow proceeds to a step S135.

At the step S135, the PWM control circuit 17 and the motor driving circuit 18 are caused to drive the film cartridge motor 19 in the direction of ejecting the film cartridge 1. As a result, the film cartridge 1 is ejected out of the film cartridge chamber of the camera. After the film cartridge ejecting action, the flow proceeds to a step S136.

At the step S136, the demonstration film cartridge flag is cleared. This clearing action prevents a normal unexposed film cartridge from being treated as a demonstration film cartridge when the camera is loaded with the unexposed film cartridge later on.

Next, the displaying action of the ISO sensitivity and number-of-frames information branching from the flow chart of FIG. 8 will be described with reference to the flow chart of FIG. 9, and the manners of display on the LCD device 29 when displaying the ISO sensitivity and number-of-frames information will be described with reference to FIGS. 10(a) to 10(d).

Figure 9:
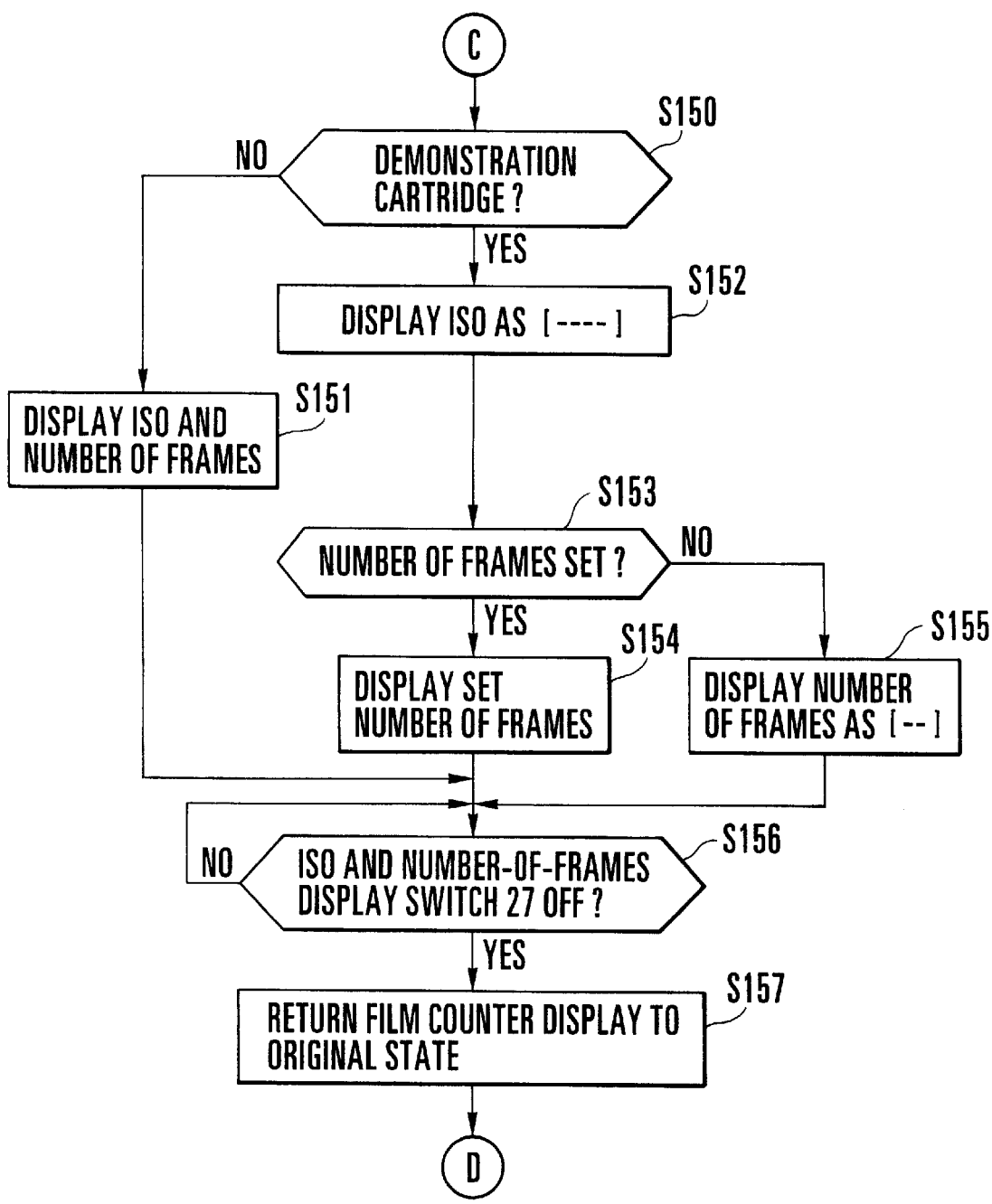
FIG. 9 is a flow chart showing the operation of the control circuit as continuing from a flow of FIG. 8.

In cases where the ISO sensitivity and number-of-film-frames display switch 27 is found to be turned on at the step S122 of FIG. 8, the flow of operation proceeds to the step S150 of FIG. 9 as mentioned above.

Referring to FIG. 9, at the step S150, the internal RAM is checked for the flag of the demonstration film cartridge to find if the film cartridge inserted is a demonstration film cartridge. If not, the flow proceeds to a step S151.

At the step S151, the LCD device 29 is caused to display thereon the ISO sensitivity value and the maximum number of frames of the film read out from the bar code disk 5 at the step S104.

FIGS. 10(a) to 10(d) show how the information on the ISO sensitivity and the number of frames of the film are displayed by the LCD device 29.

FIG. 10(a) shows a case where the camera is loaded with a normal film cartridge which is not a demonstration film cartridge, and the current value of the film counter is displayed, with the ISO sensitivity and number-of-film-frames display switch 27 being in an off-state. The display in this case shows that a frame to be next used for photographing is the twelfth frame.

When the ISO sensitivity and number-of-film-frames switch 27 is turned on in state of the FIG. 10(a), the LCD device 29 displays an ISO sensitivity value (ISO 200, in this case). At the same time, a maximum number of photographable frames (40 frames, in this case) is displayed at the film counter part as shown in FIG. 10(b). The part where the ISO sensitivity is to be displayed as shown in FIG. 10(a) may be changed to be used for displaying some other information, such as a date (year, month and day) or time. After the display is made for the ISO sensitivity and the number of frames of the film, the flow proceeds from the step S151 to a step S156.

If the film cartridge inserted is found to be a demonstration film cartridge at the step S150, the flow proceeds to a step S152.

At the step S152, the LCD device 29 is caused to display "----" in place of the ISO sensitivity as shown in FIGS. 10(c) and 10(d). In the case of the step S117 of FIG. 7, exposure control is performed on the basis of the film sensitivity ISO 800 with the film cartridge found to be a demonstration film cartridge. At the step S152, on the other hand, the sensitivity value "800" is not displayed, for the purpose of enabling the operator to know that the film cartridge currently in use is a demonstration film cartridge by making a display differently from a display to be made in the case of use of a normal film cartridge. The flow then proceeds to the next step S153.

At the step S153, the result of the step S104 of FIG. 7 is checked to find if information on the maximum number of frames of the film is set in a bar code of the bar code disk 5. If so, the flow proceeds to a step S154. If not, the flow proceeds to a step S155. Unlike a normal film cartridge, in the case of a demonstration film cartridge in which no film is contained, the indication of a maximum number of photographable frames bears no meaning. On some of the demonstration film cartridges, therefore, a maximum number of photographable frames is spuriously set for the sake of interchangeability with other film cartridges.

If a maximum number of photographable frames is found at the step S153 as to be set, the flow proceeds to the step S154. At the step S154, the LCD device 29 is caused to display the setting value of the maximum number of photographable frames at its film counter part. FIG. 10(c) shows a case where the display is made for a demonstration film cartridge on which information about a maximum number of photographable frames is set. In this case, the maximum number of frames is set as 40.

If no maximum number of photographable frames is found to be set at the step S153, on the other hand, the flow proceeds to the step S155. At the step S155, the LCD device 29 is caused to display "--" I at its film counter part. FIG. 10(d) shows the display made for a demonstration film cartridge on which no information about a maximum number of photographable frames is set.

After the step S154 or the step S155, the flow of operation proceeds to a step S156.

At the step S156, a check is made to find if the ISO sensitivity and number-of-film-frames display switch 27 has turned off. If not, the flow repeats the step S156 until this switch 27 comes to turn off. When the switch 27 turns off, the flow proceeds to a step S157.

At the step S157, the ISO film sensitivity and the maximum number of photographable frames displayed on the LCD device 29 are put out and the film counter display is reinstated there. The flow then returns to the step S120 of FIG. 8.

The flow of operation for displaying the information about the ISO sensitivity and the number of film frames then comes to an end.

As mentioned above, the steps S107 to S114 are skipped in a case where the camera is loaded with a demonstration film cartridge. Therefore, the film loading action which is normally performed to transport the film is not performed. The steps S125 to S128 of FIG. 8 are also skipped and, therefore, the one-frame film winding action which is normally performed after a shot is taken is also not performed. Further, the steps S131 to S132 of FIG. 8 are also skipped and, therefore, the film rewinding action is also not performed. All the actions that relate to film transportation are thus inhibited in the case of a demonstration film cartridge, although other actions such as the photo-taking action of the step S123 and the film cartridge ejecting action of the step S135 are performed.

Further, in the case of a demonstration film cartridge, the process of setting the unexposed-state flag is internally executed at the step S116 of FIG. 7 irrespective of the exposure state indication read out at the step S103 of FIG. 7. Therefore, in the case of a demonstration film cartridge, even if the film cartridge bears the exposure state indication of the "partially exposed", "exposed" or "developed" state, a photographing operation is not inhibited to permit a demonstration to be carried out at a camera store (shop).

The exposure state indication is set at the "unexposed" state immediately after the film cartridge is found to be a demonstration film cartridge at the step S119 of FIG. 7. Therefore, the film cartridge is never ejected in a state of having any inappropriate indication of exposure state, even if the film cartridge happens to be suddenly ejected. Since the ISO film sensitivity is set at "800" at the step S117 of FIG. 7, flashing by the flash device is effectively suppressed, so that the battery of the camera can be saved from being wasted.

Further, in the case of a demonstration film cartridge, the display of the ISO film sensitivity and the number of the film frames to be made by the LCD device 29 becomes different from a display to be made for a normal film cartridge as mentioned above in the description of the step S152 of FIG. 9. This arrangement thus enables the operator of the camera to easily make a discrimination between a normal film cartridge and a demonstration film cartridge.

The manner in which the display of the number of film frames to be made in the event of a demonstration film cartridge having no information about an ISO film sensitivity value and a number of film frames set on the cartridge is not limited to the manner described above. The display may be made in any other suitable manner so long as the cartridge can be discriminated from a normal film cartridge. A liquid crystal display of seven segments is arranged in the case of this embodiment. However, the display arrangement may be replaced, for example, with use of a liquid crystal display device which is capable of making a dot display in such a way as to display "DEMO" in the event of use of a demonstration film cartridge.

The step S103 of FIG. 7 which is provided for reading the information on the exposure state of the film cartridge is next described in detail as follows.

FIGS. 11(a) to 11(d) show by way of example a positional relation obtained between the exposure state indication of the film cartridge 1 and the bar code disk 5 employed in accordance with this invention. For easy understanding, the bar code disk 5 is illustrated as if it is completely exposed to the outside. As mentioned in the foregoing, the index 2a which shows the exposure state of the film and the bar code disk 5 are arranged to rotate respectively with the supply spool of the film cartridge. Therefore, the relation between the exposure state indication and the stopping position of the bar code disk 5 are almost unvarying.

FIG. 11(a) shows the position of the bar code disk 5 obtained when the index 2a shows an "unexposed" state. FIG. 11(b) shows the position of the bar code disk 5 obtained when the index 2a shows a "partially exposed" state. FIG. 11(c) shows the position of the bar code disk 5 obtained when the index 2a shows an "exposed" state. FIG. 11(d) shows the position of the bar code disk 5 obtained when the index 2a shows a "developed" state.

In FIG. 11(a), an arrow shows the direction of film rewinding. In reading information on the exposure state of the film and also in setting the exposure state indication, the bar code disk 5 is rotated in the direction of this arrow. Triangular marks PR1 and PR2 which point cutout parts 4a and 4b respectively indicate positions where the photo-reflectors 21 and 23 read the bar codes. A bright edge 5a immediately following a dark part which extends about one half of the circumference of the bar code disk 5 is used as a reference edge in reading the bar code information.

With the exposure state indication and the bar code disk 5 in the positional relation as shown in FIGS. 11(a) to 11(d), the exposure state of the film indicated by the film cartridge is judged in the following manner.

Figure 12:
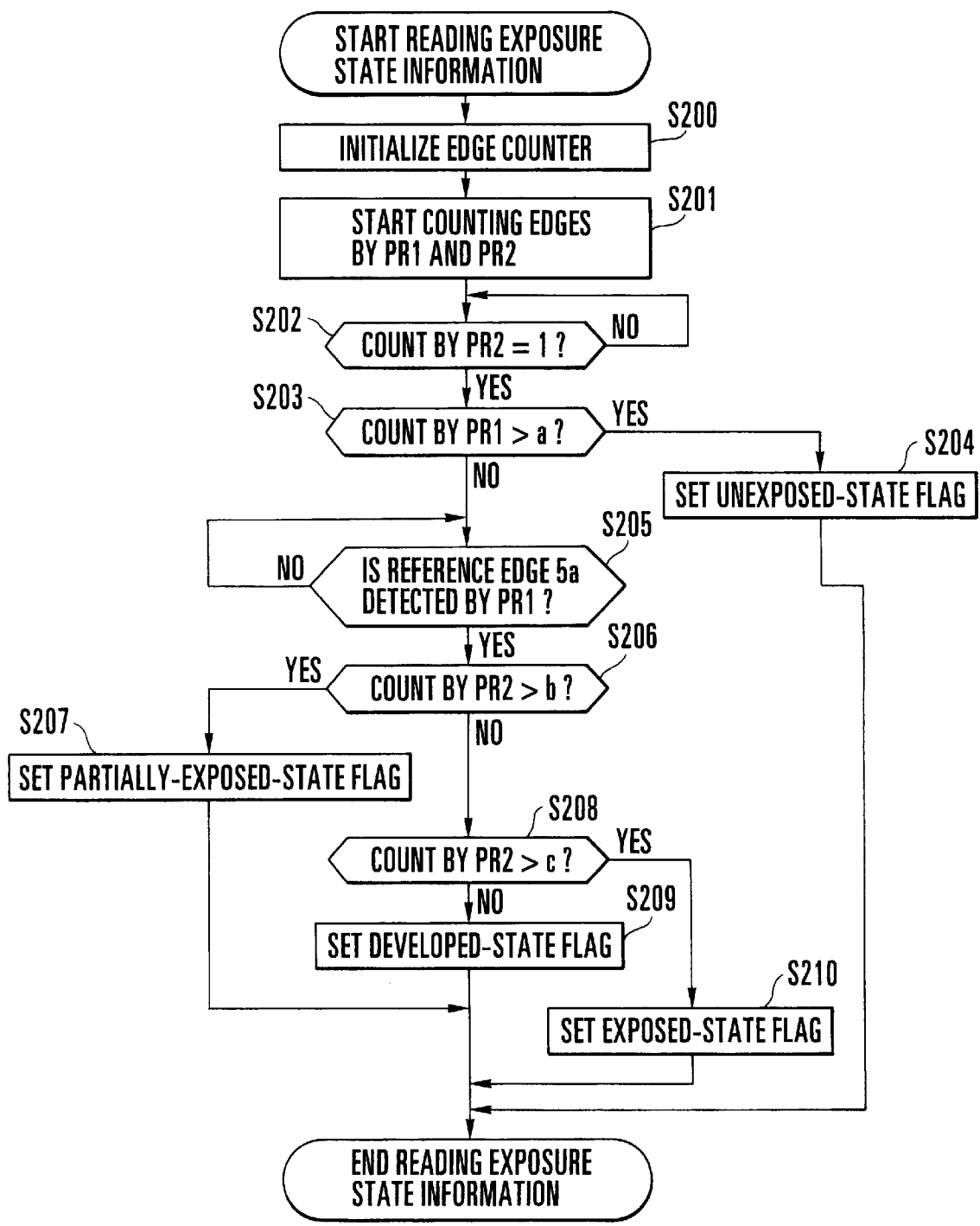
FIG. 12 is a flow chart showing the details of an action to be executed at a step S103 of FIG. 7.

FIG. 12 is a flow chart showing in detail the actions executed by the control circuit 11 in reading the exposure state of the film cartridge 1 at step S103 of FIG. 7.

Before executing this flow of operation of FIG. 12, power is supplied in the film rewinding direction at the step S102 of FIG. 7 as mentioned in the foregoing.

At the commencement of reading the exposure state information, the flow of operation begins at a step S200.

At the step S200, a counter which is provided for counting the edges of bright and dark bar codes of the bar code disk 5 (including "bright→dark" and "dark→bright") is initialized to "0". This counter is arranged either on the RAM of the control circuit 11 or as a peripheral circuit thereof and includes two counters which are arranged respectively for the photo-reflectors 21 and 23 (shown as PR1 and PR2 in FIG. 11). After the initialization, the flow proceeds to a step S201.

At the step S201, the photo-reflector control circuits 20 and 22 are caused to drive respectively the photo-reflectors 21 and 23 to begin to detect the edges of the bar codes on the bar code disk 5. Then, every time the edge of each of the bar codes is detected by each photo-reflector, the count value of each edge counter is incremented by "1" and the flow proceeds to a step S202.

At the step S202, while the edges of bar codes are being counted, a check is made to find if the count value of the edge counter of the photo-reflector 23 has become "1". If not, the step S202 is repeated while allowing the count of the edges of the bar codes to continue. When the count value becomes "1", the flow of operation proceeds to a step S203.

At the step S203, a check is made to find if the count value of the edge counter of the photo-reflector 21 is larger than a predetermined value "a" when the count value of the edge counter of the photo-reflector 23 has become "1". With the positional relation of the exposure state indication to the bar code disk 5 assumed to be established at each of different exposure states as shown in FIGS. 11(a) to 11(d), the predetermined value "a" is "8" or "9". If the count value is found to be larger than the predetermined value "a", the exposure state of the film is judged to be the "unexposed" state and the flow proceeds to a step S204.

At the step S204, with the film decided to be in the unexposed state, a flag for the exposure state is set in the "unexposed" state and the exposure state information reading action comes to an end.

If the count value of the edge counter of the photo-reflector 21 is found at the step S203 to be not larger than the predetermined value "a", the flow proceeds to a step S205.

At the step S205, a check is made to find if the reference edge 5a which appears immediately after the dark part extending over nearly one half of the circumference of the bar code disk 5 has been detected by the photo-reflector 21. If not, the step S205 is repeated until the reference edge 5a is detected. The reference edge 5a can be detected either by the method of considering an edge part of a "dark-to-bright" change taking place immediately after detection of a dark period longer than a predetermined length of time to be the reference edge 5a or by the following method. A check is made to find how many edges are counted by the other photo-reflector 23 before the photo-reflector 21 comes to detect the edge of "dark-to-bright" change and, when a number of edges which is equal to or larger than a predetermined number is counted, the edge of the "dark-to-bright" change is considered to be the reference edge 5a. After detection of the reference edge 5a, the flow proceeds to a step S206.

AT the step S206, a check is made to find how many edges are counted by the photo-reflector 23 before the reference edge 5a is detected by the photo-reflector 21 after the commencement of supply of power for film rewinding. Then, if the photo-reflector 23 is found to have counted a number of edges more than a predetermined number "b", the film is decided to be in the "partially exposed" state. With the positional relation of the exposure state indication to the bar code disk 5 assumed to be established at each of different exposure states as shown in FIGS. 11(a) to 11(d), the predetermined number "b" is, for example, 12 or 13. The flow of operation then proceeds to a next step S207.

At the step S207, since the film cartridge is decided to be in the partially exposed state, the exposure-state flag is set as "partially exposed". The exposure state information reading operation then comes to an end.

If the photo-reflector 23 is found to have not counted more edges than the predetermined number "b" at the step S206, the flow proceeds to a step S208.

At the step S208, a check is made to find if more edges than a predetermined number "c" are counted by the photo-reflector 23 before the reference edge 5a is detected by the photo-reflector 21 after the commencement of supply of power for film rewinding. With the positional relation of the exposure state indication to the bar code disk 5 assumed to be established at each of different exposure states as shown in FIGS. 11(a) to 11(d), the predetermined number "c" is, for example, 7 or 8. The predetermined numbers "b" and "c" are in a relation of "b>c". With the number of edges counted by the photo-reflector 23 found to be not more than the predetermined number "c", the film is considered to be in the developed state, and the flow proceeds to a step S209.

At the step S209, since the film is considered to have been developed, the exposure-state flag is set as "developed" and the exposure state information reading action comes to an end.

If the number of edges counted by the photo-reflector 23 is found to be more than the predetermined number "c" at the step S208, the film is decided to be in the "exposed" state, and the flow proceeds to a step S210.

At the step S210, with the film decided to be exposed, the exposure-state flag is set as "exposed" and the exposure state information reading action comes to an end.

The flow of the exposure state information reading operation comes to an end through these steps.

The actions of setting the exposure state indication of the film cartridge to be executed at the step S119 of FIG. 7 and the step S133 of FIG. 8 are next described in detail as follows.

For causing the film cartridge to indicate the exposure state, the bar code disk 5 is brought to a stop at one of the positions shown in FIGS. 11(a) to 11(d) for the "unexposed", "partially exposed", "exposed" or "developed" states as applicable.

Figure 13:
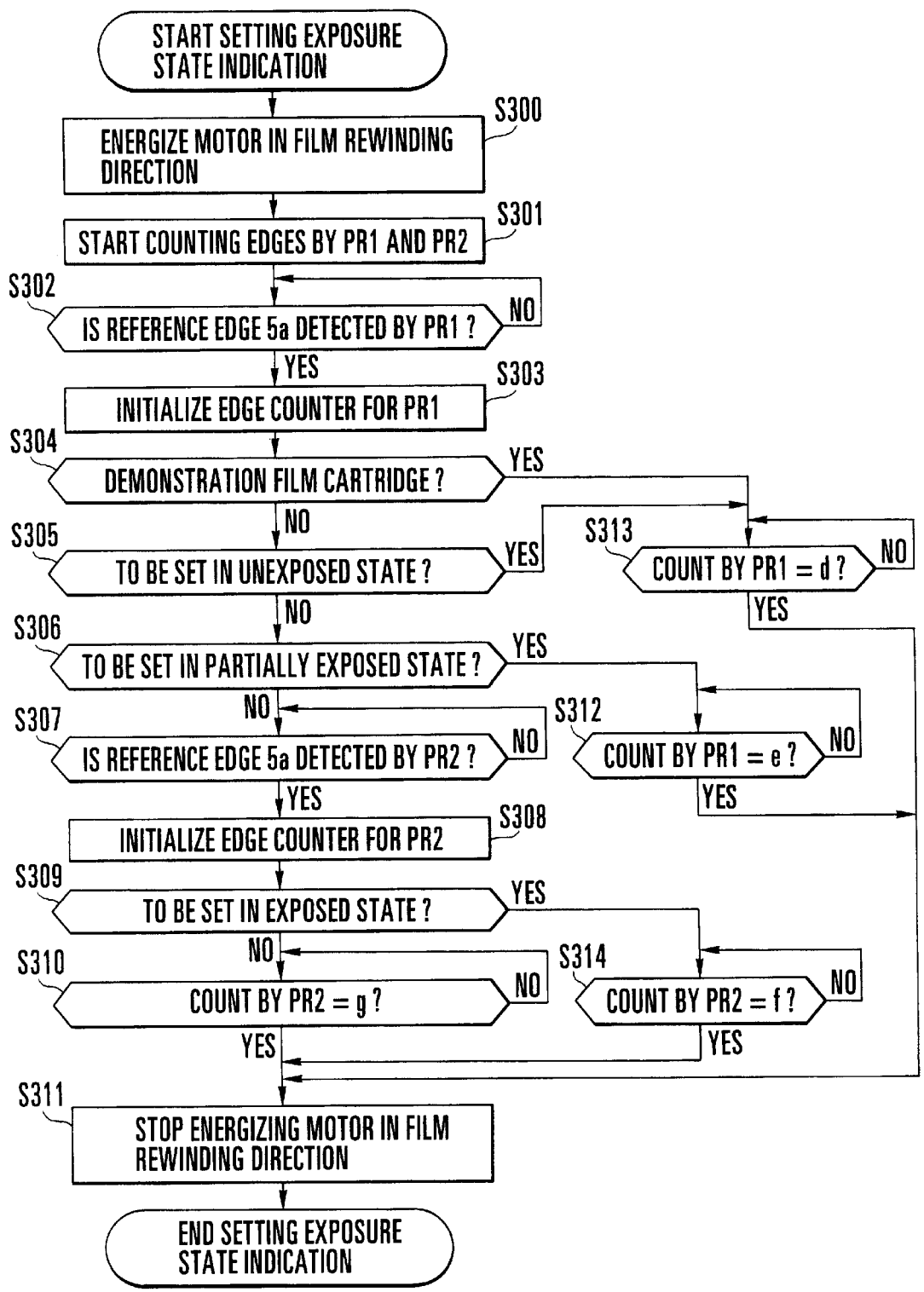
FIG. 13 is a flow chart showing the details of actions of steps S119 and S133 of FIGS. 7 and 8.

FIG. 13 is a flow chart showing actions to be executed by the control circuit 11 in setting the exposure state of the film cartridge (at the steps S119 and S133).

At a step S300 shown in FIG. 13, the film transport motor 16 is caused to be driven in the film rewinding direction. The flow of operation then proceeds to a step S301.

At the step S301, the photo-reflector control circuits 20 and 22 and the photo-reflectors 21 and 23 are driven to begin to detect the edges of the bar codes on the bar code disk 5. One is added to the count of edges every time an edge is counted by each of the photo-reflectors 21 and 23. After that, the flow of operation proceeds to a step S302.

At the step S302, a check is made to find if the photo-reflector 21 has detected the reference edge 5a immediately after the dark part extending about one half of the circumference of the bar code disk 5. The reference edge 5a is detected in the same manner as in the case of the step S205 of FIG. 12 described in the foregoing. If the reference edge 5a is found to be not detected by the photo-reflector 21, the step S302 is repeated until the reference edge 5a is detected. When the reference edge Sa is detected, the flow of operation proceeds to a step S303.

At the step S303, the edge counter for the photo-reflector 21 (PR1 in FIG. 11) is initialized to "0". The flow then proceeds to a step S304.

At the step S304, a check is made through a demonstration film cartridge flag to find if the film cartridge 1 inserted in the camera is a demonstration film cartridge. If so, the flow proceeds to a step S313. If not, the flow proceeds to a step S305.

At the step S305, flags on the internal RAM are checked to find if the exposure state indication is to be set in the "unexposed" state. If so, the flow proceeds to the step S313. If not, the flow proceeds to a step S306.

At the step S306, flags on the internal RAM are checked to find if the exposure state indication is to be set as "partially exposed". If so, the flow proceeds to a step S312. If not, the flow proceeds to a step S307.

At the step S307, a check is made to find if the reference edge 5a has been detected by the photo-reflectors 23 (PR2) immediately after the dark part which extends covering about one half of the circumference of the bar code disk 5. The check for detection of the reference edge 5a is made in the same manner as the detection of it by the photo-reflector 21 (PR1) checked at the step S205 of FIG. 12. If the reference edge 5a is found to be not detected as yet, the step S307 is repeated until it is detected. After the detection of the reference edge 5a, the flow proceeds to a step S308.

At the step S308, the edge counter for the photo-reflector 23 (PR2 in FIG. 11) is initialized to "0". The flow then proceeds to a step S309.

At the step S309, flags on the internal RAM are checked to find if the exposure state indication is to be set as "exposed". If so, the flow proceeds to a step S314. If not, the flow proceeds to a step S310 for setting the "developed" state.

At the step 310, the exposure state indication is set in the "developed" state by making a check to find if the number of edges of the bar codes counted by the photo-reflector 23 (PR2) has reached a predetermined number "g". The step S310 is repeated until the number of edges counted reaches the predetermined number "g". Then, the exposure state indication is considered to have been set in the "developed" state, and the flow proceeds to a step S311. In a case where the positional relation of the bar code disk 5 to the exposure state indication at thee "developed" state is as shown in FIG. 11(d), the above-stated predetermined number "g" is, for example, "9".

At the step S311, since the bar code disk 5 has already reached a predetermined exposure state indicating position, the film transport motor 16 is brought to a stop, and the flow of the exposure state indication setting operation comes to an end.

As mentioned above, the flow of operation proceeds to the step S312 if the exposure state indication is found to be set in the "partially exposed" state at the step S306.

At the step S312, the exposure state indication is set as "partially exposed" by making a check to find if the number of edges of the bar codes counted by the photo-reflector 21 (PR1) has reached a predetermined number "e". The step S312 is repeated until the number of edges counted reaches the predetermined number "e". Then, with the exposure state indication considered to have been set in the "partially exposed" state, the flow proceeds to the step S311. If the positional relation of the bar code disk 5 to the exposure state indication at the "partially exposed" state is as shown in FIG. 11(b), the above-stated predetermined number "e" is, for example, "14".

In cases where the film cartridge is found to be a film cartridge for demonstration at the step S309 and where the exposure state indication is found to be set in the "unexposed" state at the step S305, the flow of operation proceeds to the step S313 as mentioned above.

At the step S313, the exposure state indication is set in the "unexposed" state by making a check to find if the number of edges of the bar codes counted by the photo-reflector 21 (PR1) has reached a predetermined number "d". Therefore, the step S313 is repeated until the number of edges counted reaches the predetermined number "d". Then, with the exposure state indication considered to have been set in the "unexposed" state, the flow proceeds to the step S311. If the positional relation of the bar code disk 5 to the exposure state indication at the "unexposed" state is as shown in FIG. 11(a), the above-stated predetermined number "d" is, for example, "4".

If the exposure state indication is found to be set in the "exposed" state at the step S309 as mentioned above, the flow proceeds to a step S314.

At the step S314, the exposure state indication is set as "exposed" by making a check to find if edges of bar codes counted by the photo-reflector 23 (PR2) has reached a predetermined number "f". The step S314 is repeated until the number of edges counted reaches the predetermined number "f". Then, the exposure state indication is considered to have been set in the "exposed" state, the flow proceeds to the step S311. If the positional relation of the bar code disk 5 to the exposure state indication at the "partially exposed" state is as shown in FIG. 11(c), the above-stated predetermined number "f" is, for example, "4".

As mentioned above, after completion of setting the exposure state indication at each of the steps S310, S312, S313 and S314, the flow proceeds to the step S311.

At the step S311, since the bar code disk 5 has reached a predetermined exposure state indicating position, the film transport motor 16 is brought to a stop, and the flow of exposure state indication setting operation comes to an end.

According to the arrangement of the embodiment described, in setting the exposure state indication, the film cartridge for demonstration is always set as in the unexposed state without fail, so that the demonstration film cartridge can be repeatedly used without recourse to any special tool.

The embodiment is arranged by way of example to wind the film up to a frame where the film become usable for photographing if the camera is loaded with a film cartridge containing a partially exposed film (the steps S109 to S112 of FIG. 7). However, in cases where the film has a magnetic record indicating whether or not the film have been used for photographing, some of low-price cameras may not be provided with any circuit for reading the magnetic record on the film. In the event of such a camera, it is hardly possible to detect the position of an unexposed frame although the camera is capable of finding the partially exposed state of the film cartridge through the bar code information provided on the cartridge. In such a case, it is hardly possible to load the camera with the film without causing a double exposure for some of frames that have already been exposed for photographing. In such a case, to avoid the trouble of double exposure, the camera either may be arranged to set the index 2a in its "exposed" position and to eject the film cartridge without carrying out the film loading action, if a film cartridge is inserted therein in the partially exposed state, or may be arranged to likewise set the "exposed" state when the film is rewound halfway before all frames of the film are used for photographing.

Further, with respect to a film cartridge which contains a developed film, the camera never sets the film cartridge to indicate the "developed" state when the film cartridge is inserted in an exposure state other than the "developed" state. Therefore, the camera may be arranged to handle the film cartridge of the developed state in the same manner as a film cartridge of the "exposed" state.

In other words, in such a case, the exposure state indicating position to be set by the camera is either the "unexposed" state or the "exposed" state.

In the embodiment described, the switch 27 (of FIG. 6) is discretely arranged for displaying the ISO sensitivity and the number of film frames. Means for displaying the ISO sensitivity and the number of frames of the film is not limited to the switch arrangement described. It is possible to use a switch which is arranged to switch functions from one function to another according to turning-on or turning-off of a main switch which is not shown. For example, a switch which performs switching between a mode of using a flash device and a mode of not using the flash device when the main switch turns on may be arranged to permit the display of the ISO film sensitivity and the number of film frames when the main switch is in an off-state. The display also may be arranged to be made when a plurality of switches provided for different functions are simultaneously operated.

The embodiment described is arranged by way of example to electrically eject the film cartridge (the steps S134 and S135 of FIG. 8). The arrangement may be changed, in accordance with this invention, to have the film cartridge manually taken out by manually opening the lid of the cartridge chamber of the camera. In that case, since a demonstration film cartridge is set to indicate the "unexposed" state at the step S119 of FIG. 7 when the cartridge is inserted, the demonstration film cartridge may be promptly taken out by opening the lid of the cartridge chamber as desired, without operating the rewinding switch 25, so that the operability of the camera can be enhanced.

The embodiment described is arranged to set the film sensitivity at a high sensitivity value when the camera is loaded with a demonstration film cartridge, for the purpose of suppressing the flashing action of the flash device. That arrangement may be changed to directly inhibit the flash device from flashing in a case where the camera is loaded with a demonstration film cartridge.

When a demonstration film cartridge is loaded or inserted, the embodiment described does not perform any film transporting action because no film loading action is necessary. Therefore, in demonstrating a photographing action, the possibility of occurrence of troubles and errors due to an unnecessary film transporting action can be effectively eliminated. This is an advantage of the embodiment.

Another advantage of the embodiment lies in that, when the embodiment is loaded with a demonstration film cartridge, actions related to photographing other than the film transporting action, such as automatic loading and ejecting actions on the film cartridge, light and distance measuring actions, a shutter release action, etc., are not inhibited, so that demonstrations can be effectively carried out at a camera store (or shop).

Further, the embodiment described is arranged such that, even if a demonstration film cartridge loaded in the embodiment is in a film exposure state which inhibits photographing, the embodiment permits a photographing action and, with a demonstration film cartridge found by film cartridge discriminating means to be loaded, the film exposure state setting means is instructed to set the indication of the film exposure state indicating part of the cartridge into a first state, i.e., the "unexposed" state, immediately after the camera is loaded with the demonstration film cartridge. Therefore, when the demonstration film cartridge is used at a camera store, the demonstration film cartridge never becomes unusable after the end of one photographing demonstration but can be repeatedly used for demonstrations without recourse to any special tool.

Further, according to the arrangement of the embodiment, since film exposure state setting means is instructed, soon after the film cartridge discriminating means finds a demonstration film cartridge to have been loaded, to set the indication of the film exposure state indicating part in the "unexposed" state, the indication of the film exposure state indicating part can be set without fail in a state permitting repeated use of the demonstration film cartridge even after the demonstration film cartridge is ejected without carrying out a film rewinding action.

Since the embodiment described is arranged to set the film sensitivity at a high sensitivity value for the purpose of suppressing a flashing action of the flash device when the film cartridge discriminating means finds the use of a demonstration film cartridge, consumption of the battery of the camera caused by demonstrations carried out at a camera store can be minimized.

Further, the embodiment described is arranged to cause its normal information display for a normal film cartridge to become different when a demonstration film cartridge is loaded. The difference enables the operator to know use of a demonstration film cartridge in place of a normal cartridge.

Figure 14:
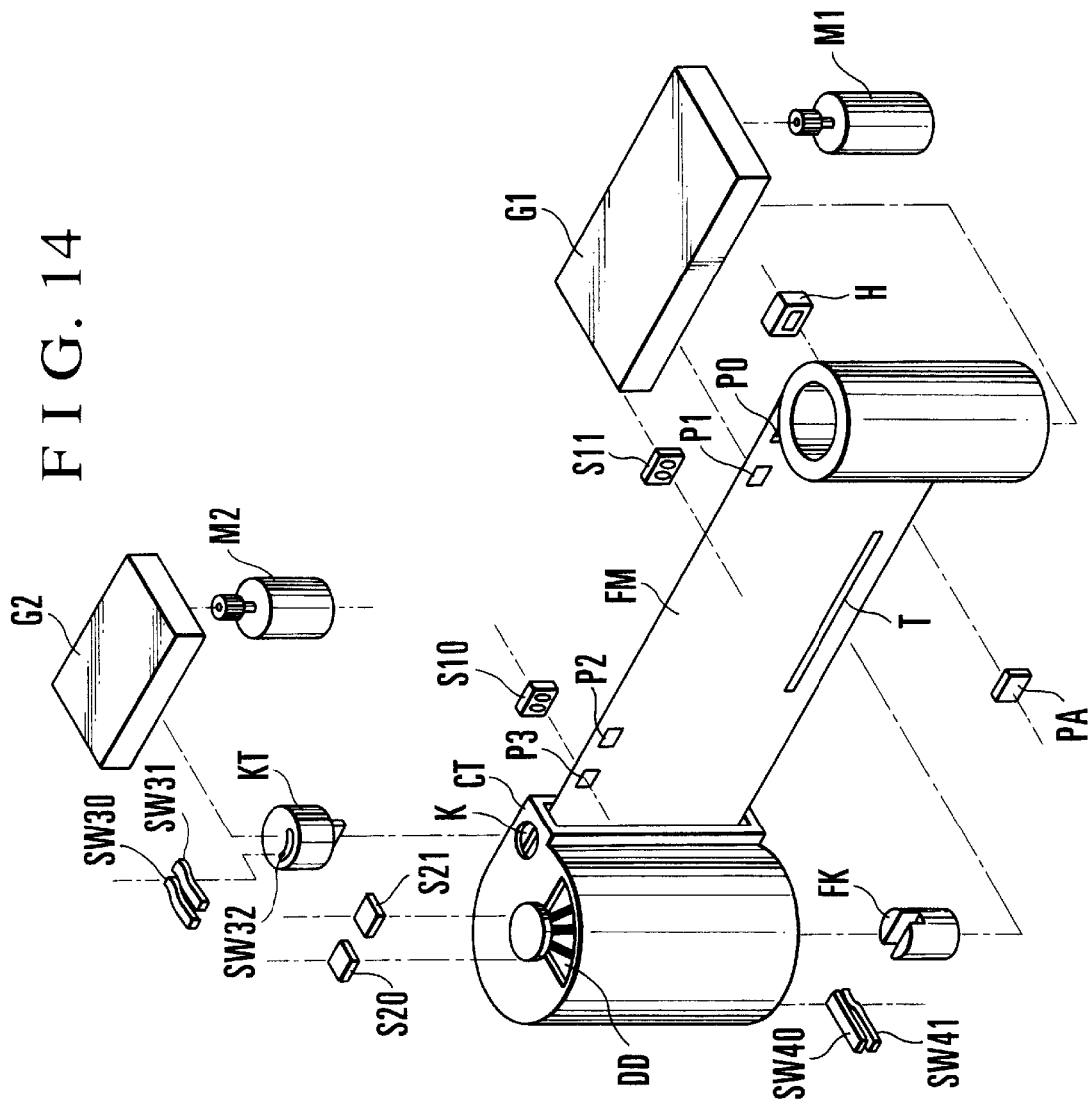
FIG. 14 is a perspective view showing a film transport system of a camera arranged as another embodiment of this invention and the arrangement of a film cartridge to be used for the same camera.

FIG. 14 is an oblique view showing the arrangement of a film transport system of a camera according to another embodiment of this invention and a film cartridge to be used for the camera.

In FIG. 14, reference symbol CT denotes the film cartridge. An opening-and-closing member K is arranged to be rotated for opening and closing a light shielding door provided for a film exit port of the film cartridge CT. An information indicating member DD is arranged to indicate in black-and-white patterns the kind, the sensitivity, a specified number of photographable frames of a film FM contained in the film cartridge CT. A fork FK is arranged to send out and rewind the film FM by rotating with a shaft of the film cartridge CT.

The information indicating member DD is arranged in a disk-like shape and to be rotated by the rotation of the fork FK in the same manner as a member disclosed in Japanese Laid-Open Patent Application No. HEI 5-313233. The information indicating member DD is thus arranged to indicate information on a photographing (exposure) state of the film, such as an "unexposed" state, a "partially exposed" state or a "completely exposed" state according to a position where the disk member DD is in pause.

Photoelectric conversion elements S20 and S21 are arranged, for example, as photo-reflectors in the neighborhood of the information indicating member DD to read the black-and-white patterns of the information indicating member DD when the member DD rotates. The elements S20 and S21 thus serve as information input means to read the black-and-white patterns.

Switch contacts SW40 and SW41 are arranged to be short-circuited when the camera is loaded with the film cartridge CT. These switch contacts SW40 and SW41 are thus arranged to form a detecting switch for detecting the presence or absence of the film cartridge CT. An opening-and-closing driving member KT is provided for driving an opening-and-closing member K. When the opening-and-closing driving member KT is in a position to open the light shielding door after driving the opening-and-closing member K, a short circuit is effected by a conductive part SW32 disposed on the opening-and-closing driving member KT in such a way as to show that the light shielding door has been driven to its open position. In other words, the conductive part SW32 is arranged to form a light-shielding-door opening-and-closing detection switch together with the switch contacts SW30 and SW31.

The film FM has a magnetic recording part (a magnetic recording track) T formed thereon and also has perforations P0 to P3 formed therein to be used in defining the position of each photographing frame on the film FM. Sensors S10 and S11 are provided for detecting a motion and a stopping position of the film FM and are, for example, composed of photoelectric conversion elements. A magnetic head H is arranged to read and write magnetic information out of and into the magnetic recording part T of the film FM. A pad PA is arranged to push the magnetic head H against the magnetic recording part of the film FM. A first motor M1 is provided for winding and rewinding the film FM. A gear train G1 is arranged to connect the fork FK and a film winding spool to the first motor M1. A second motor M2 is provided for driving the opening-and-closing driving member KT. A gear train G2 is arranged to connect the opening-and-closing driving member KT to the second motor M2.

Figure 15:
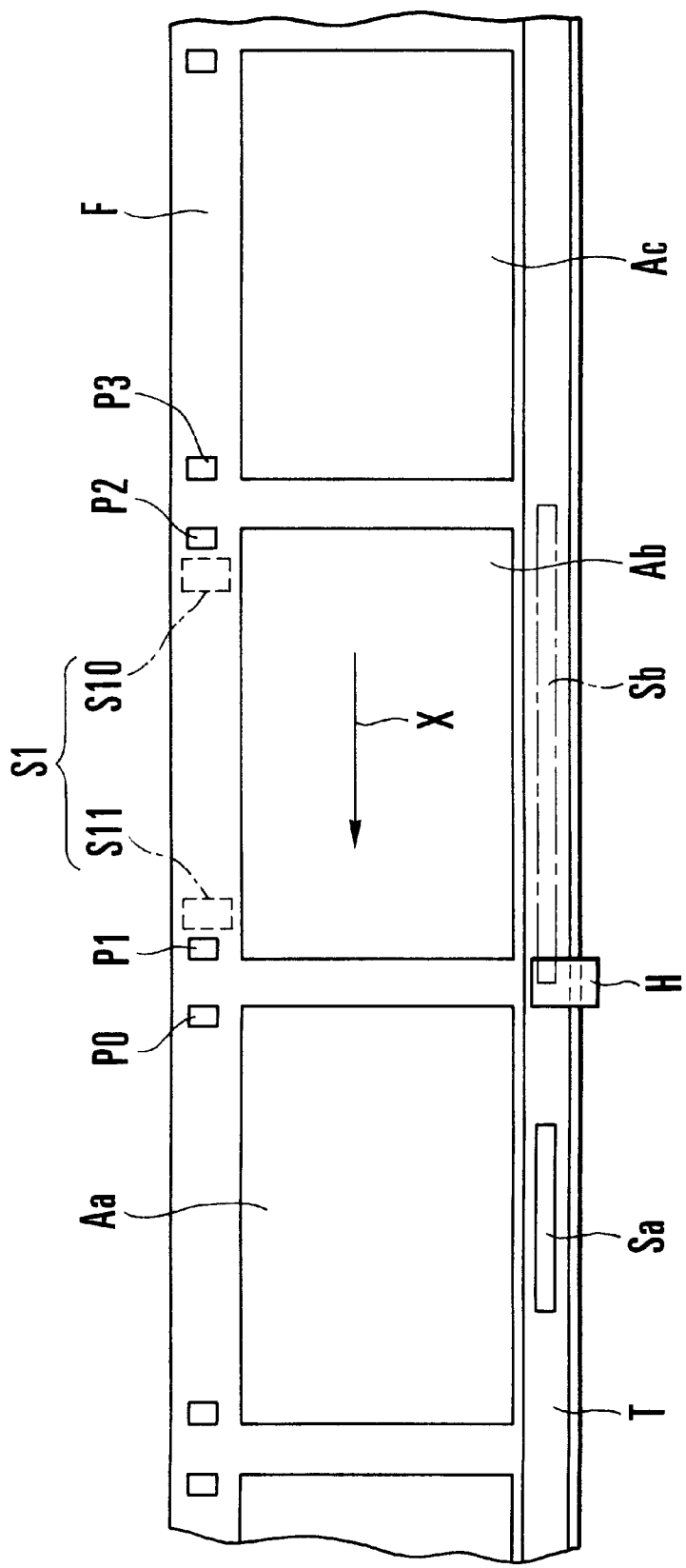
FIG. 15 shows a relation obtained among a film FM, photoelectric sensors S10 and S11 and a magnetic head H in the camera shown in FIG. 14.

FIG. 15 shows the film FM in relation to the photoelectric sensors S10 and S11 and the magnetic head H. In FIG. 15, reference symbol Aa denotes a picture plane or a frame already used for photographing. A frame Ab is currently located at an aperture to be next used for photographing. A frame Ac is a frame to be used for photographing after the frame Ab. Reference symbol T denotes the magnetic recording part provided on the film FM as mentioned above. Reference symbol Sa denotes an area where some information relative to photographing is written in by the magnetic head H when the photographed (exposed) frame Aa is wound up. Another area Sb is arranged to be used by the magnetic head H for writing information relative to photographing when the frame Ab is wound after photographing. Reference symbol X denotes a direction in which the film FM is wound.

The photoelectric sensors S10 and S11 are arranged on the inner side of a picture plane and close to the perforations P2 and P1 which define a photographing frame as shown in FIG. 15 when the film FM is stopped at a normal stopping position.

Figure 16:
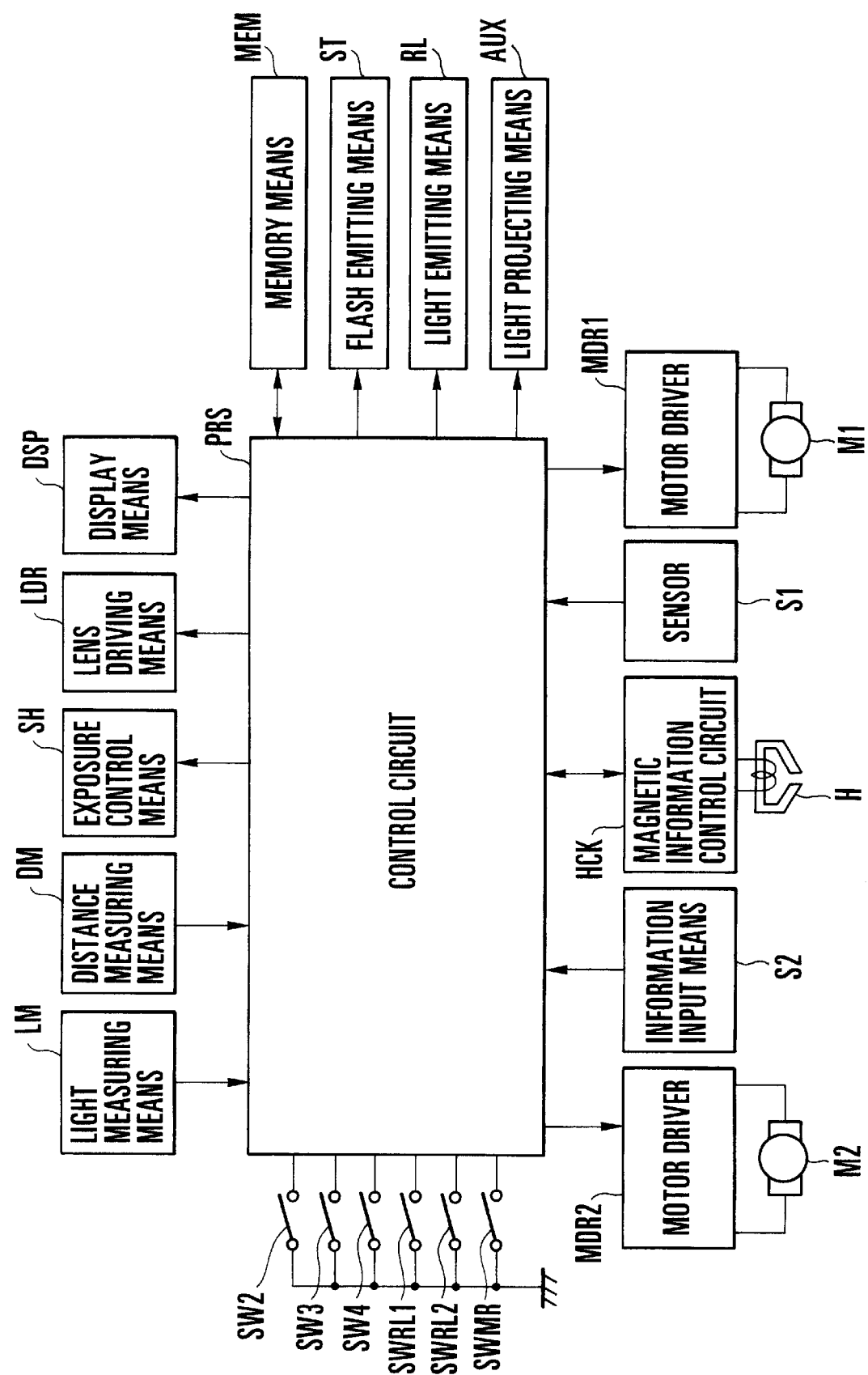
FIG. 16 is a block diagram showing the circuit arrangement of the camera shown in FIG. 14.

FIG. 16 is a block diagram showing the electrical circuit arrangement of the camera shown in FIG. 14.

In FIG. 16, reference symbol PRS denotes a control circuit which controls the sequence of actions of the whole camera. The control circuit PRS is composed of, for example, a microcomputer. The sequence of actions of the control circuit PRS will be described in detail later.

A motor driver MDR1 is arranged to drive the first motor M1 described above with reference to FIG. 14. The motor driver MDR1 drives the first motor M1 under the control of the control circuit PRS in such a way as to energize it for normal rotation, to apply the brake and so on. A sensor S1 consists of the photoelectric sensors S10 and S11. The output of the sensor S1 is inputted to the control circuit PRS to enable the control circuit PRS to find the movement and the stopping position of the film FM by monitoring the output of the sensor S1 A magnetic information control circuit HCK is arranged to supply writing information to the magnetic head H and to amplify reading information obtained from the magnetic head H. The control circuit PRS supplies necessary information to the magnetic information control circuit HCK, in recording magnetic information on the film FM, and monitors the output of the magnetic information control circuit HCK in reading magnetic information out from the film FM.

Information input means S2 consists of the sensors S20 and S21 shown in FIG. 14. The outputs of the sensors S20 and S21 are inputted to the control circuit PRS to enable the control circuit PRS to find the kind of the film FM and photographing information by monitoring the outputs of these sensors S20 and S21. A motor driver MDR2 is arranged to drive the second motor M2 shown in FIG. 14. The motor driver MDR2 drives the second motor M2 under the control of the control circuit PRS, to energize the second motor M2 for normal and reverse rotations, to apply the brake to the motor M2 and so on.

A switch SWRL1 is arranged to be turned on by the first stroke of operation of a release switch of the camera. A signal of the switch SWRL1 is inputted to the control circuit PRS. A switch SWRL2 is arranged to be turned on by the second stroke of the release switch and to input its signal to the control circuit PRS. A switch SW2 is provided for detection of opening and closing of the lid of a film cartridge chamber which is not shown. The signal of the switch SW2 is inputted to the control circuit PRS. A switch SW3 is a light-shielding-door opening-and-closing detecting switch which consists of the switch contacts SW30 and SW31 and the conductive part SW32 shown in FIG. 14. The signal of the switch SW3 is inputted to the control circuit PRS. A switch SW4 is a film-cartridge presence-or-absence detecting switch which consists of the switch contacts SW40 and SW41 shown in FIG. 14. The signal of the switch SW4 is inputted to the control circuit PRS. A switch SWMR is a switch provided for detecting a descent of a main mirror of the camera. The signal of the switch SWMR is also inputted to the control circuit PRS.

Light measuring means LM is formed, for example, with a phototransistor, etc., and arranged to input its output to the control circuit PRS. The light measuring means LM enables the control circuit PRS to obtain information on luminance of an object to be photographed by reading the output of the light measuring means LM. Distance measuring means DM is formed, for example, with a CCD line sensor, etc., and arranged to input its output to the control circuit PRS. The distance measuring means DM enables the control circuit PRS to obtain information on a distance to the object by reading the output of the distance measuring means DM. Exposure control means SH is formed, for example, with a shutter, a diaphragm, etc., and arranged to make an exposure of the film on the basis of a signal from the control circuit PRS. Lens driving means LDR consists of, for example, a motor, a motor driving circuit, a transmission mechanism, etc., and arranged to drive a lens on the basis of a signal from the control circuit PRS. Display means DSP is formed, for example, with an LED and an LCD and arranged to make various displays on the basis of signals outputted from the control circuit PRS.

Memory means MEM is provided for storing a data conversion table which will be described later herein. The memory means MEM is a rewritable, nonvolatile storage device such as an EEPROM or an FRAM. Flash emitting means ST is provided for illuminating an object to be photographed at the time of taking a shot. Light emitting means RL is a red-eye mitigating light emitting means provided for mitigating a red-eye phenomenon which tends to take place in the case of flash photography. Light projecting means AUX is an auxiliary light projecting means provided for automatic focusing in a case where the luminance of an object to be photographed is insufficient.

Figure 17:
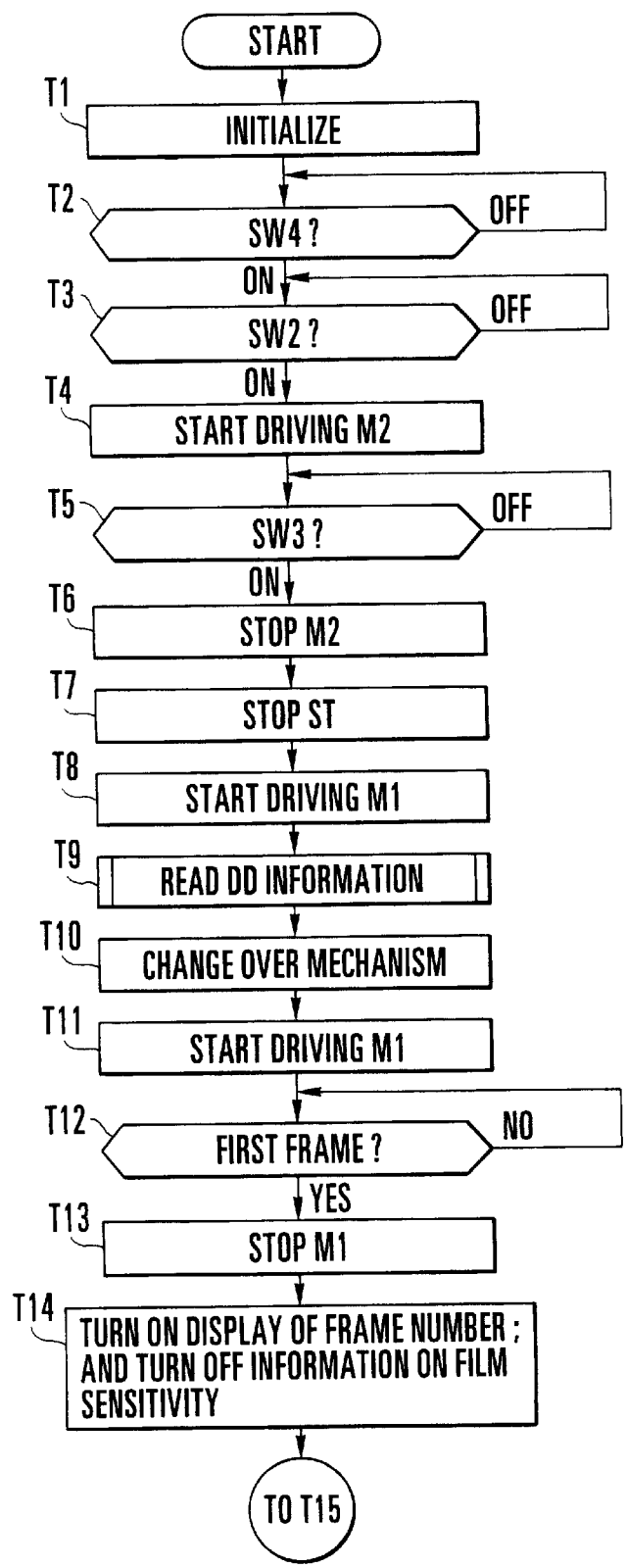
FIG. 17 is a flow chart showing in part an operation of a control circuit of FIG. 16 to be carried out with a microcomputer used for the control circuit.

FIG. 17 is a flow chart showing a sequence of actions of the control circuit PRS. The control circuit PRS operates as described below with reference to FIG. 17.

The control circuit PRS begins to operate when a power supply switch (not shown) turns on to render the control circuit PRS operative. At a step Ti, the control circuit PRS initializes its memories and ports. At a step T2, a check is made for the state of the film-cartridge presence-or-absence detecting switch SW4. If the switch SW4 is found to be in an off-state indicating that the film cartridge FK is absent, i.e., not inserted, the flow of operation waits for insertion of the film cartridge. When the film cartridge FK is inserted to turn on the switch SW4, the flow proceeds to a step T3.

At the step T3, a check is made for the state of the switch SW2 which is provided for detecting the open or closed state of the lid of the film cartridge chamber. If the switch SW2 is found to be in an off-state thus indicating that the lid of the film cartridge chamber still remains open, the flow waits for closing of the lid. When the lid of the film cartridge chamber is closed, causing the switch SW2 to turn on, the flow of operation proceeds to a step T4.

At the step T4, a control signal is supplied to the motor driver MDR2 to cause the second motor M2 to be driven. At a step T5, a check is made for the state of the light-shielding-door opening-and-closing detecting switch SW3. The flow of operation waits for detection of an on-state of the switch SW3 which indicates that the light shielding door of the film cartridge is open. When the on-state of the switch SW3 is detected, the flow proceeds to a step T6. At the step T6, a control signal is outputted to cause the motor driver MDR2 to stop driving the second motor M2.

At the next step T7, the control circuit PRS outputs a signal for inhibiting a charging action on the flash emitting means ST and its flashing action. At a step T8, a control signal is supplied to the motor driver MDR1 to cause it to start driving the first motor M1. The first motor M1 then begins to cause the information indicating member DD to rotate. At a step T9, information recorded on the information indicating member DD is obtained.

The action of obtaining information from the information indicating member DD is described in detail below with reference to FIG. 21 which is a flow chart.

Figure 21:
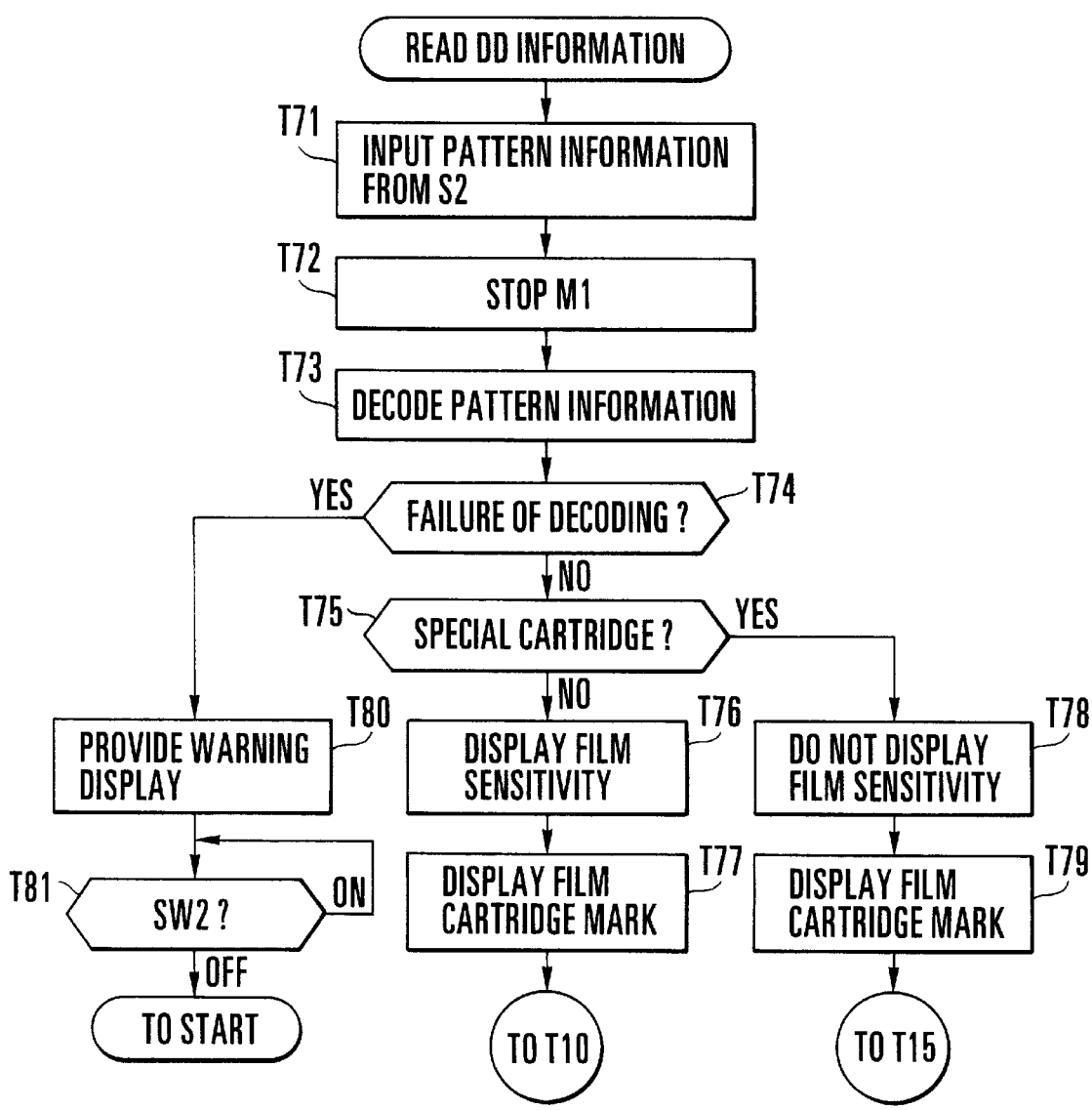
FIG. 21 is a flow chart showing the operation as continuing from a flow shown in FIG. 20.

At a step T71 of FIG. 21, the control circuit PRS obtains black-and-white pattern information which is encoded and recorded on the information indicating member DD. At a step T72, a control signal is supplied to the motor driver MDR1 to cause it to stop driving the first motor M1. At a step T73, the encoded black-and-white pattern information obtained is decoded into information about the kind, the sensitivity and a specified number of photographable frames of the film.

Figure 22:
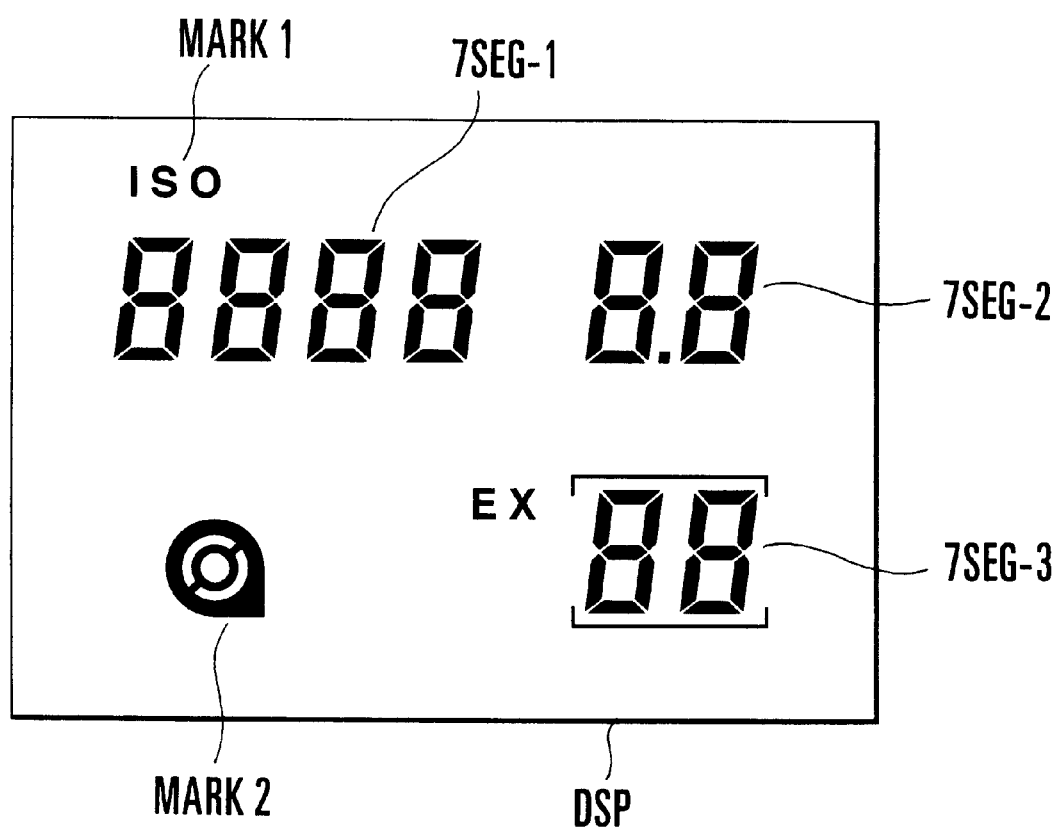
FIG. 22 shows by way of example a display made by a display means shown in FIG. 16.

At a step T74, a check is made to find if the information about the film obtained through the decoding process is a correct code. Normally the code obtained by decoding is not erroneous. With the code found to be correct, the flow proceeds to a step T75. At the step T75, a check is made to find if the film information obtained by decoding is a specific code indicating a special cartridge. If not, i.e., if the film information indicates a normal film cartridge and not a special cartridge, the flow proceeds to a step T76. At the step T76, data of film sensitivity obtained on the basis of decoded film information is sent to the display means DSP shown in FIG. 16 to cause the display means DSP to display the film sensitivity. The details of the display means DSP are shown in FIG. 22. In this instance, the film sensitivity data is displayed by a segment group 7SEG-1 on the display means DSP.

At a step T77, data is sent to the display means DSP to cause it to light up a mark 2 which indicates the presence of the film cartridge FK. The flow then proceeds to a step T10 shown in FIG. 17.

If the film information obtained by decoding is found at the step T75 to be a specific code indicating a special cartridge such as a demonstration film cartridge, the flow proceeds to a step T78. At the step T78, the film sensitivity is not displayed because film sensitivity data bears no meaning for a special cartridge which is not to be used for photographing. At the next step T79, data is sent to the display means DSP to cause it to light up the mark 2 which indicates the presence of the film cartridge FK. After the step T79, the flow proceeds to a step T15 shown in FIG. 18.

Further, if the film information obtained by decoding is found at the step T74 to be an erroneous code, (inhibited index) the flow proceeds from the step T74 to a step T80. The erroneous codes obtained by decoding likely have resulted from some defect or flaw in the information indicating member DD or some abnormality on the part of the information input means S2. Use of the film cartridge for photographing in such a condition might bring about some inconvenience. At the step T80, therefore, photographing is inhibited and a warning against it is displayed. The display of inhibition of photographing may be arranged to be made, for example, by sending some data to the display means DSP to cause the display means DSP to flicker a segment group 7SEG-3 and the mark 2.

At the next step T81, a check is made for the state of the switch SW2 which is provided for detecting the opening and closing of the lid of the film cartridge chamber. The flow of operation waits until the film cartridge FK is taken out by opening the lid of the film cartridge chamber. The switch SW2 turns off when the lid is open. When the switch SW2 is found to have turned off, the flow of operation returns to the start thereof.

Again referring to FIG. 17, at the step T10, a switching action is performed on a mechanism which is not shown in such a way as to permit film loading by driving the first motor M1. At a step T11, a control signal is sent to the motor driver MDR1 to cause it to start 60 driving the first motor M1. This causes the process of film loading to begin.

At a step T12, the flow waits till the film FM is transported to the position of the first photographing frame. When the film FM is found to have been moved to the position of the first photographing frame, the flow proceeds to a step T13. At the step T13, a control signal is sent to the motor driver MDR1 to cause it to stop driving the first motor M1. The process of the film loading action then proceeds to an end.

At a step T14, with the film loading action coming to an end, data indicative of a frame number "1" is sent to the display means DSP to cause it to display the film frame number. At the display means DSP, the film frame number is displayed by a segment group 7SEG-3. Then, the display of film sensitivity made at the step T76 of FIG. 21 is put out. After the end of the step T14, the flow proceeds to a step T15 of FIG. 18.

Figure 18:
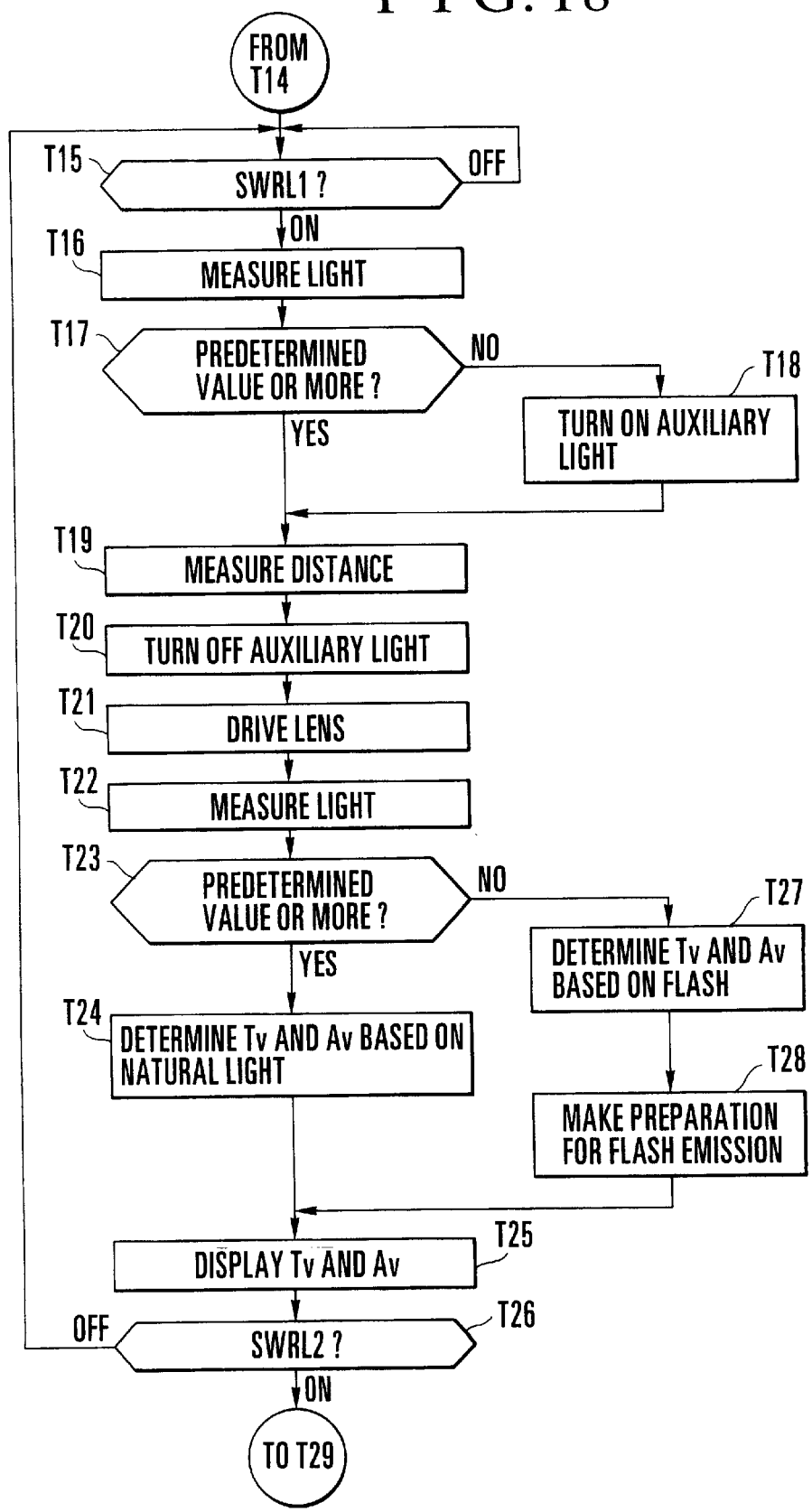
FIG. 18 is a flow chart showing the above-stated operation as continuing from a flow shown in FIG. 17.

In the case of a special cartridge which is arranged not for photographing, the flow of operation proceeds to the step TIS of FIG. 18 after completion of the step T79 of FIG. 21. In this instance, therefore, the process of loading the camera with the film FM at the steps T10 to T14 is not performed.

At the step T15 (FIG. 18), a check is made to find if the switch SWRL1 which is the first stroke switch of the release switch of the camera has turned on. If so, the flow proceeds to a step T16. At the step T16, information on luminance of an object to be photographed is obtained from the light measuring means LM. At a step T17, a check is made to find if the information on the luminance of the object obtained indicates a value equal to or above a predetermined value permitting distance measurement. If so, the flow proceeds to a step T19. If not, the flow proceeds to a step T18. In the case of coming to the step T18, the object luminance is not sufficient. At the step T18, therefore, the light projecting means AUX is caused to light up to illuminate the object, so that distance to the object can be measured even when the object has insufficient luminance.

At the step T19, information on the distance to the object is obtained from the distance measuring means DM. At a step T20, the light of the light projecting means AUX is put out. This step T20 is meaningless where the step T18 is not executed with the object having a sufficient degree of luminance. However, if the step T18 is executed, the light of the light emitting means AUX used at the step T18 is put out at this step T20.

At a step T21, a signal prepared on the basis of information on the object distance obtained is sent to the lens driving means LDR to cause it to drive the lens into an in-focus position. At a step T23, a check is made to find if the information on the object luminance obtained indicates a value equal to or above a predetermined value at which flashing by a flash device becomes unnecessary. If so, the flow proceeds to a step T24. The result of the check and decision made at this step T23 as to whether or not the information on the object luminance is not below the predetermined value at which flash emission becomes unnecessary is stored in a memory of the control circuit PRS, because the result of the decision becomes necessary at some of steps subsequent to the step T23.

At the step T24, a shutter speed and an aperture value are decided for an apposite exposure on the basis of the information on the measured luminance of the object. At a step T25, the data of the shutter speed and the aperture value decided at the step T24 is sent to the display means DSP to cause the display means DSP to display the shutter speed Tv and the aperture value Av. At a step T26, a check is made for the state of the switch SWRL2 which is the second stroke switch of the release switch of the camera. If the switch SWRL2 is found to be in an off-state, the flow returns to the step T15 of FIG. 18. If the switch SWRL2 is found in an on-state, the flow proceeds to a step T29 of FIG. 19.

In a case where the luminance of the object is found to be less than the predetermined value at the step T23, the flow proceeds to a step T27. At the step T27, since the object luminance is insufficient, a shutter speed and an aperture value suited for photographing with the aid of the flash emitting means ST are decided. At a step T28, a control signal is sent to the flash emitting means ST to cause it to prepare for flash emission. After the step T28, the flow proceeds to the above-stated step T25 for an information display. The flow then proceeds to the step T26 to make the check for the state of the switch SWRL2 as mentioned above. Then, if the switch SWRL2 is found to be in an on-state, the flow proceeds to the step T29 of FIG. 19 as mentioned above.

Figure 19:
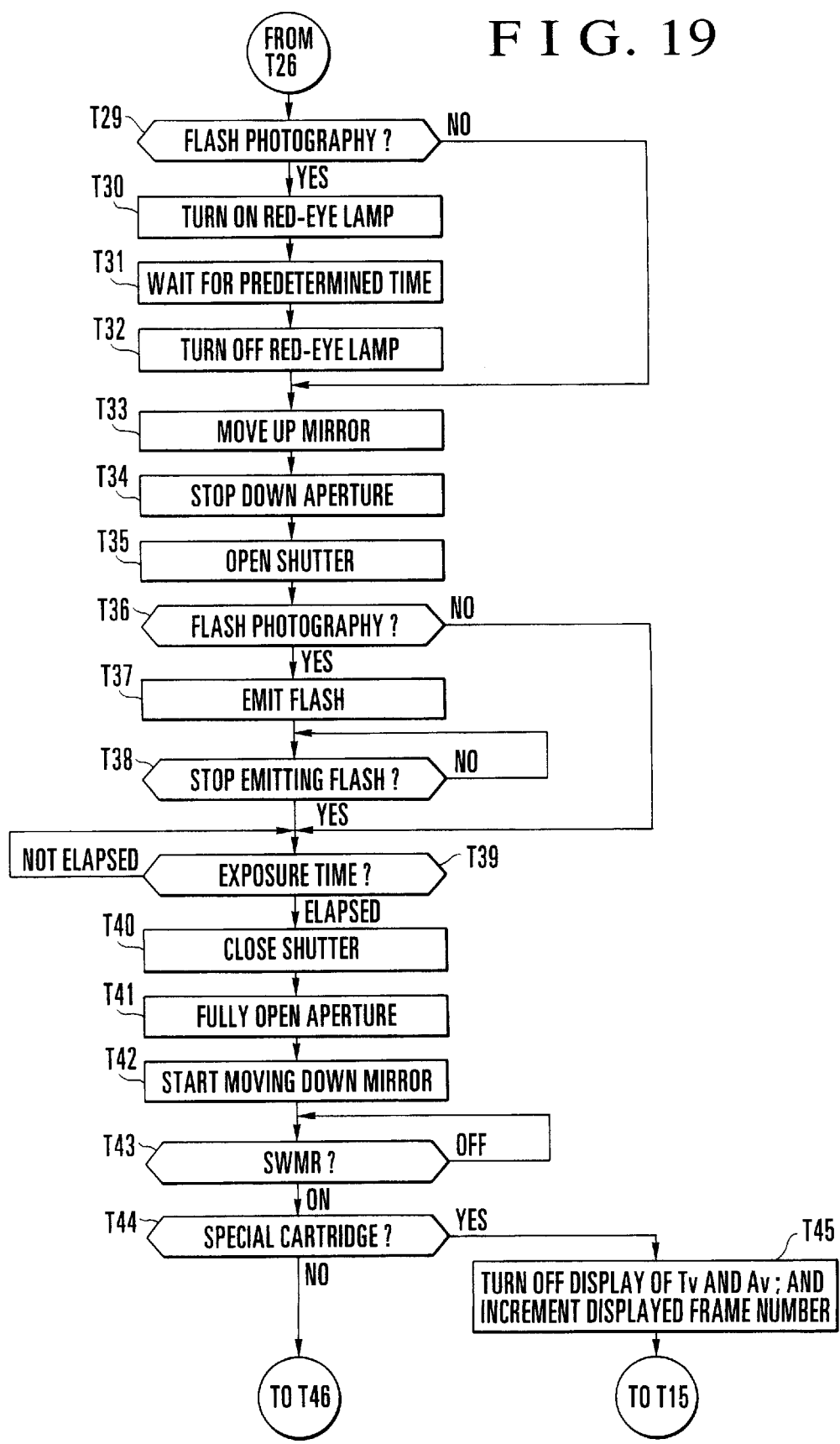
FIG. 19 is a flow chart showing the operation as continuing from a flow shown in FIG. 18.

At the step T29 of FIG. 19, the information on the object luminance which is stored as a result of the check made at the step T23 is examined to find if the luminance is equal to or above the predetermined value at which flash emission becomes unnecessary. If not, the flow proceeds to a step T30. At the step T30, the red-eye mitigating light emitting means RL is caused to emit its light for the purpose of mitigating a red-eye phenomenon which tends to take place in flash photographing. At a step T31, the flow waits for the lapse of a predetermined length of time required for the light emission by the light emitting means RL. At a step T32, the light emitting means RL is caused to stop its light emission.

In a case where the result of the check is found at the step T29 to be equal to or above the predetermined value, the flow proceeds immediately to a step T33 without executing the steps T30, T31 and T32 as no flash emission is required in this instance.

At the step T33, a mirror driving mechanism which is not shown is controlled and caused to move the main mirror upward. At a step T34, the exposure control means SH is controlled and caused to stop down the aperture of a diaphragm on the basis of the aperture value decided at the step T24 or at the step T27. At a step T35, the exposure control means SH is caused to start an exposure by allowing a shutter to begin to travel.

At a step T36, the stored information on the object luminance is checked, in the same manner as at the step T29, to find if the object luminance is equal to or above the predetermined value at which flash emission becomes unnecessary. If not, the flow proceeds to a step T37. At the step T37, a trigger signal is sent to the flash emitting means ST to cause it to start flash emission. At the next step T38, the flow waits for the end of the flash emission.

In a case where the result of the check made by the step T36 indicates a luminance value which is equal to or above the predetermined value, the flow proceeds immediately to a step T39 without executing the steps T37 and T38 as flash emission is not required.

At the step T39, the flow waits for the lapse of an exposure time based on the shutter time decided at the step T24 or T27 described in the foregoing. After the lapse of the exposure time, the flow proceeds to a step T40. At the step T40, the exposure control means SH is caused to close the shutter. At a step T41, the exposure control means SH is caused to fully open the diaphragm aperture. At a step T42, the mirror driving mechanism which is not shown is caused to begin to move the main mirror downward.

At a step T43, the flow of operation waits for completion of the descent of the main mirror by obtaining information from the switch SWMR which is arranged to detect the downward movement of the main mirror. After that, the flow proceeds to a step T44. At the step T44, a check is made to find if the film information obtained by decoding at the step T75 of FIG. 21 is a specific code indicating a special cartridge. If not, the flow proceeds to a step T46 of FIG. 20. If so, the flow proceeds to a step T45.

At the step T45, the information on the shutter speed and the aperture value displayed at the step T25 is put out. Further, the data of film frame number displayed by the segment group 7SEG-3 at the display means DSP is incremented by one. After completion of these actions at the step T45, the flow returns to the step T15 of FIG. 18. In other words, the film winding action is not performed in the event of a special cartridge.

Figure 20:
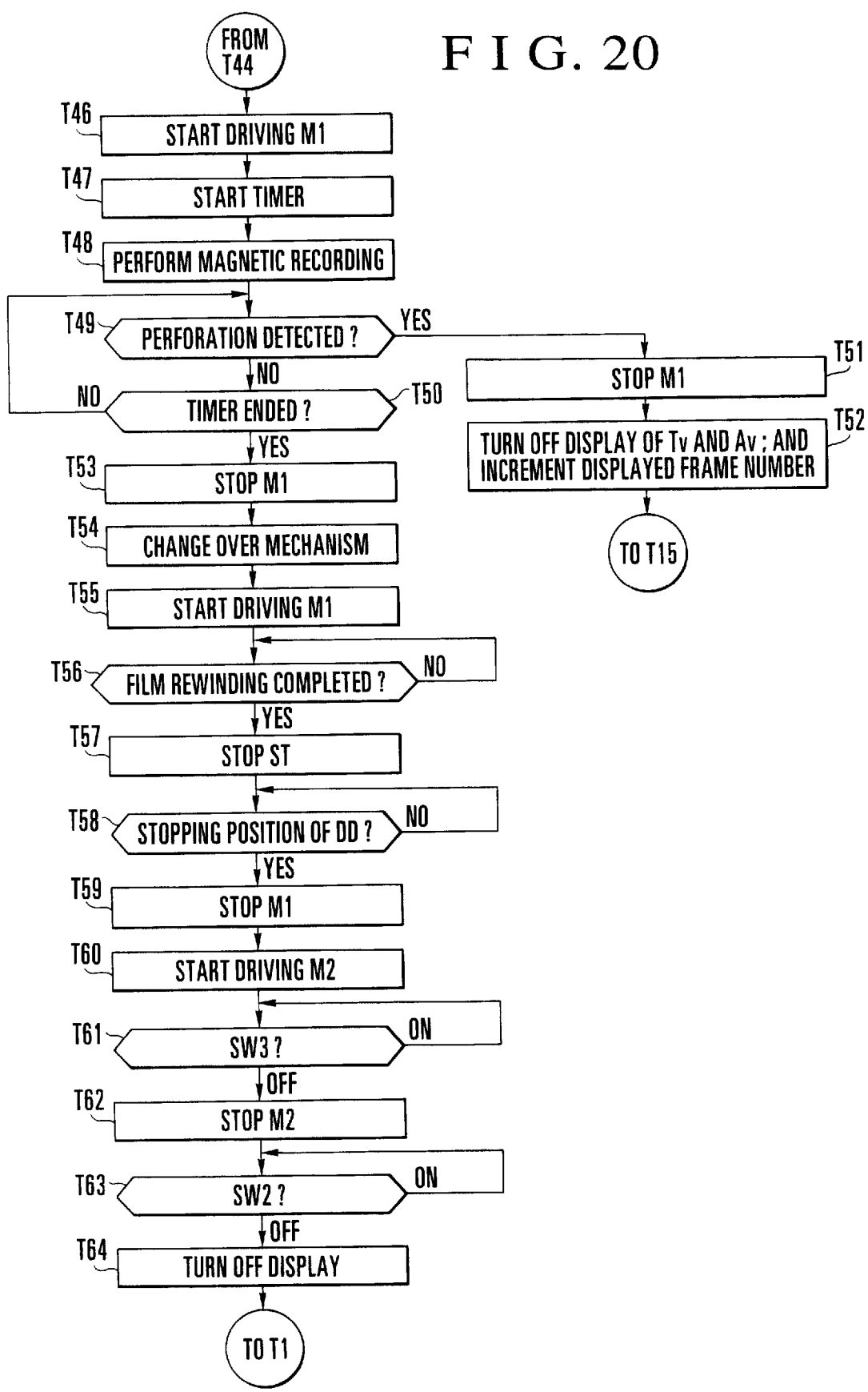
FIG. 20 is a flow chart showing the operation as continuing from a flow shown in FIG. 19.

At the step T46 of FIG. 20, a control signal is sent to the motor driver MDR1 to cause it to start driving the first motor M1. The first motor M1 begins to wind the film. At a step T47, a timer for detecting the perforations of the film is caused to start operating. At a step T48, necessary information about photographing is magnetically recorded.

At a step T49, the output of the sensor S1 is monitored and checked to find if the film FM is moved to the position of the next photographing frame. If not, the flow proceeds to a step T50. At the step T50, a check is made to find if a predetermined length of time is counted by the timer started at the step T47. If not, the flow of operation returns to the step T49.

With these processes repeated, when the film FM is found at the step T49 to have been moved to the position of the next photographing frame, the flow proceeds to a step T51. At the step T51, a control signal is sent to the motor driver MDR1 to cause it to stop driving the first motor M1. At a step T52, the information on the shutter speed and the aperture value displayed at the step T25 is caused to be put out. The data of film frame number displayed by the segment group 7SEG-3 is incremented by one. Upon completion of the step T52, the flow returns to the step T15 of FIG. 18.

If the timer is found at the step T50 as to have finished the count of the predetermined length of time, the flow proceeds to a step T53. In this case, the film FM is not transported to the position of the next photographing frame even if the film FM is wound for the predetermined length of time. This means that the last frame of the film FM has already been used for photographing. The film FM must be rewound in that instance.

The flow, therefore, first proceeds to a step T53. At the step T53, a control signal is sent to the motor driver MDR1 to cause it to stop driving the first motor M1. At a step T54, a switching action is performed on a mechanism which is not shown in such a way as to permit film rewinding. At a step T55, a control signal is sent to the motor driver MDR1 to cause it to start driving the first motor M1. The first motor M1 then begins to rewind the film FM. At a step T56, the flow waits for the end of film rewinding.

At the next step T57, the control circuit PRS outputs a signal for inhibiting a charging action on the flash emitting means ST and the flash emitting action of the flash emitting means ST. At a step T58, the black-and-white pattern information recorded on the information indicating member DD is obtained through the information input means S2. The flow then waits until the film FM comes to a desired stop position where the member DD indicates that the film FM is in a "fully exposed" state. AT a step T59, a control signal is sent out to cause the motor driver MDR1 to stop driving the first motor M1.

At a step T60, a control signal is sent out to cause the motor driver MDR2 to start driving the second motor M2. At a step T61, a check is made for the state of the switch SW3 and the flow waits until the switch SW3 turns off to indicate that the light shielding door is closed. After that, the flow proceeds to a step T62. At the step T62, with the off-state of the switch SW3 detected, a control signal is sent out to cause the motor driver MDR2 to stop driving the second motor M2.

At a step T63, a check is made for the state of the switch SW2 which is provided for detecting the opening and closing of the lid of the film cartridge chamber. The flow waits until the switch SW2 turns off thus indicating that the lid of the film cartridge chamber is opened, that is, until the film cartridge CT is taken out. After the film cartridge CT is taken out, the flow proceeds to a step T64. At the step T64, all the display segments of the display means DSP are put out. The flow then returns to the step T1.

The second embodiment described above is arranged to obtain information on the kind of the film from the information indicating member DD provided on the film cartridge CT and to perform no film loading action if the information on the kind of film is found to be a specific code. This arrangement enables the camera to be demonstrated without fear of any erroneous operation by carrying out the flow of steps T75→T78→T79 (of FIG. 21)→step T15 (of FIG. 18) because the arrangement, unlike the conventional arrangement, does not necessitate the operator to set the demonstration mode by operating a switch. Besides, the arrangement effectively prevents consumption of the electrical energy of a battery and waste of time from being caused by unnecessary film loading and transporting actions in carrying out a demonstration.

Figure 23:
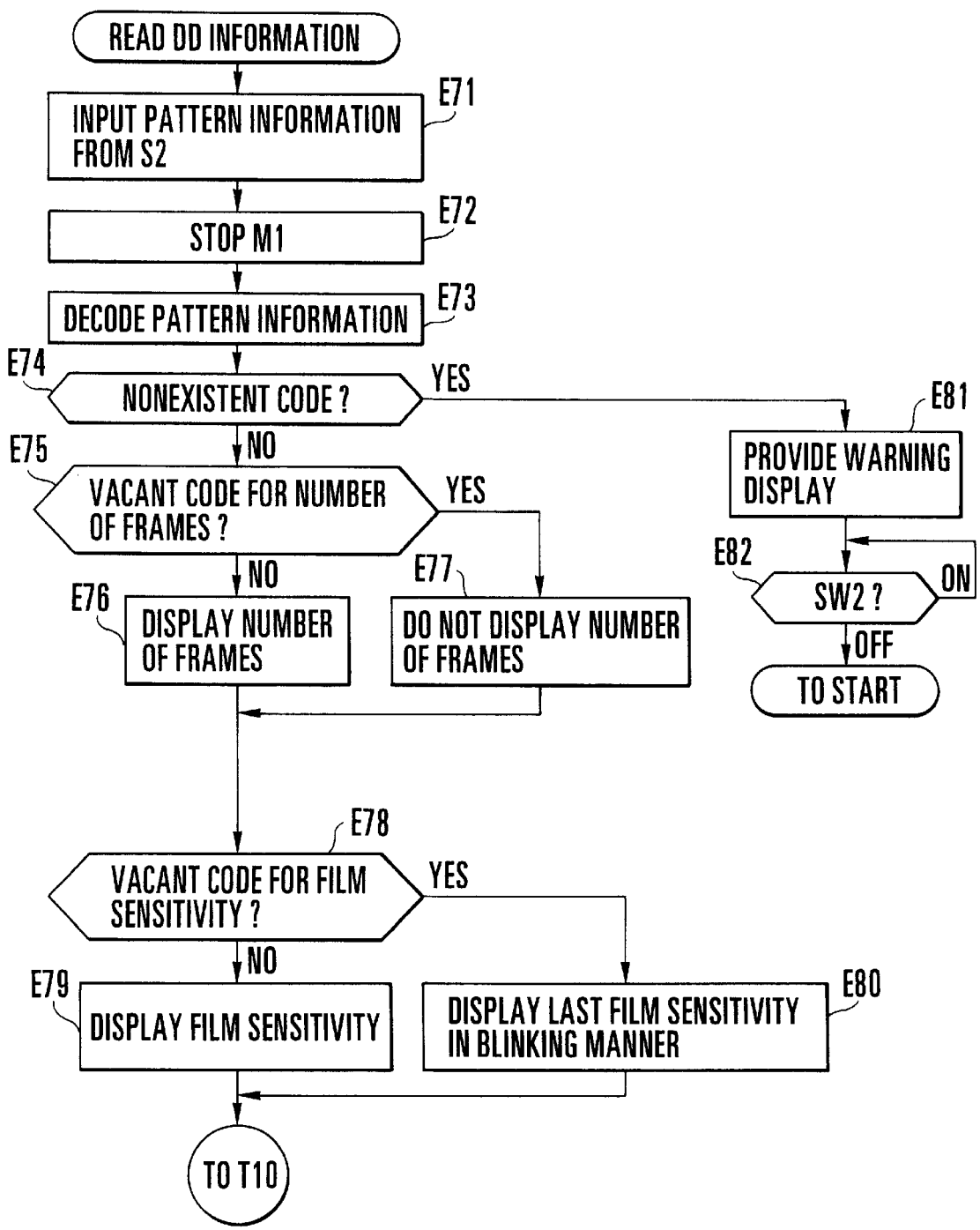
FIG. 23 is a flow chart showing the details of an action to be executed at a step T9 shown in FIG. 17.

FIG. 23 is a flow chart showing another example of the operation of obtaining the information from the information indicating member DD at the step T9 shown in FIG. 17.

Referring to FIG. 23, at a step E71, the coded black-and-white pattern information which is recorded on the information indicating member DD is obtained through the information input means S2.

At a step E72, a control signal is sent out to cause the motor driver MDR1 to stop driving the first motor M1.

At a step E73, the coded black-and-white pattern information obtained at the step E71 is decoded into data covering the kind and sensitivity of the film, a specified number of photographable frames, etc.

Assume that the coded back-and-white pattern information recorded on the information indicating member DD is data of 6 bits. The 6-bit data is assumed to be divided into two 3-bit data. One of the 3-bit data is assumed to indicate the specified number of photographable frames of the film and the other 3-bit data to indicate the film sensitivity. On that assumption, the information (data) on the number of photographable frames can be defined as shown in FIG. 24 and the information (data) on the film sensitivity as shown in FIG. 25. In FIG. 24, symbols b0, b1 and b2 respectively indicate the three bits. For example, the data is obtained by using "0" for a narrow pattern and "1" for a wide pattern included in the back-and-white pattern information of the information indicating member DD. A total of eight kinds of information can be expressed by using "0" and "1" for each of the bits b0, b1 and b2. In some cases, however, a limited space available on the information indicating member DD prevents use of "1" for all of these bits to obtain a code indicating a wide pattern. Therefore, such a code is considered to be a nonexistent code in the case of this embodiment. Other codes are allocated to 10 to 36 frames respectively as the specified number of photographable frames, with a code having "0" at all of the bits b0, b1 and b2 allocated to the specified number 10 to begin with. However, in the cases of the codes where the bits b0, b1 and b2 are "1, 0, 0" and "1, 1, 0", these codes are considered to be vacant codes representing no specified number of photographable frames. The vacant codes are provided either for the use of a special cartridge such as a demonstration film cartridge or for some other specified number of photographable frames that may arise in the future.

The other 3-bit data which is for the film sensitivity and shown in FIG. 25 is arranged on the same concept as the data shown in FIG. 24. In this case, a code having "1" at all of bits b3, b4 and b5 is handled also as a nonexistent code. A code where the bits b3, b4 and b5 are "1, 1, 0" is handled as a vacant code. Other codes are allocated to ISO sensitivity values of 25 to 400, with a code having "0" at all of the bits b3, b4 and b5 allocated to the ISO sensitivity value 25 to begin with. The codes of FIGS. 24 and 25 are shown only by way of example. They may be differently arranged as desired.

A data table to be used in converting the coded information recorded on the information indicating member DD into actual film information as shown in FIGS. 24 and 25 is stored beforehand in the memory means MEM as described in the foregoing with reference to FIG. 16.

Therefore, the control circuit PRS can obtain the information on the specified number of photographable frames of the film by making reference to the data stored beforehand in the memory means MEM in accordance with the code pattern of the information indicating member DD which is obtained at the step E71.

At a step E74, the information on the specified number of frames or sensitivity of the film obtained by decoding is checked to find if the information has been a nonexistent code due to some defect or flaw of the information indicating member DD or due to some abnormality on the part of the information input means. Since it is normally impossible to have any nonexistent code, the flow proceeds to a step E75.

At the step E75, the information on the specified number of frames or sensitivity of the film obtained by decoding is checked to find if the information has been a vacant code. Since it is normally impossible to have any vacant code, the flow proceeds to a step E76.

At the step E76, data corresponding to the decoded information on the specified number of photographable frames is sent to the display means DSP to cause it to display the specified number of photographable frames.

In a case where the information on the specified number of photographable frames is found to have been a vacant code at the step E75 because of use of a special cartridge such as a demonstration film cartridge or the like, the flow of operation proceeds from the step E75 to a step E77.

At the step E77, since the information on the specified number of photographable frames is the vacant code, data is sent to the display means DSP to cause the display of the specified number of photographable frames to become blank.

After the steps E76 or E77, the flow proceeds to a step E78.

At the step E78, a check is made to find if the decoded information on the film sensitivity has been the vacant code mentioned in the foregoing. Since it is normally impossible to have the vacant code, the flow proceeds to a step E79.

At the step E79, data corresponding to the decoded information on the film sensitivity is sent to the display means DSP to cause it to display the film sensitivity value.

In a case where the information on the sensitivity of the film is found to have been a vacant code at the step E78 because of use of a special cartridge such as a demonstration film cartridge or the like or a film of a newly set sensitivity value, the flow of operation proceeds from the step E78 to a step E80.

At the step E80, data is sent to the display means DSP in such a way as to cause it to make a display of film sensitivity by flickering the display of information on the film sensitivity last used for photographing. In the event of a camera which has never been used for photographing, the film sensitivity setting of the camera is assumed to have been set at a most-popularly-employed film sensitivity value, such as ISO sensitivity of 100.

In a case where the result of decoding found at the step E74 is a nonexistent code, the flow proceeds to a step E81.

The nonexistent code obtained by decoding might have resulted from a defect or flaw of the information detecting member DD or from an abnormality of the information input means. Photographing with such a film might bring about some inconvenience. At the step E81, therefore, photographing is inhibited and a warning display is made to show the inhibition. For example, the inhibition of photographing may be displayed by flickering all the segments of the segment groups 7SEG-3 and 7SEG-4 of the display means DSP. The control circuit PRS sends data for such a display to the display means DSP.

At a step E82, a check is made for the state of the switch SW2 which is arranged to detect the opening and closing of the lid of the film cartridge chamber. The flow waits until the switch SW2 turns on to indicate that the lid of the film cartridge chamber is opened for taking the film cartridge out from the film cartridge chamber. With the lid of the film cartridge chamber found to be opened, the flow of operation returns to its start.

After completion of the step E79 or E80, the flow proceeds to the step T10 of FIG. 17.

In cases where there is some defect or flaw in the information indicating member of the film cartridge or some abnormality on the part of the information input means, the defect or the abnormality can be detected by the arrangement of the second embodiment. Therefore, the arrangement enables the operator to know such a problem before taking a shot.

Further, since the embodiment is arranged to be capable of inhibiting photographing in a condition not favorable for photographing, no shot will be taken by mistake even when the camera happens to be loaded with any film cartridge which is unsuited for photographing. Besides, the arrangement for giving a warning effectively informs the operator of the use of an unsuitable film cartridge.

According to the arrangement of the embodiment described, in a case where the code which is initially set as a vacant code is set as a nonvacant code for a specified number of photographable frames or a film sensitivity later, the code can be used for photographing. In such a case, the embodiment is capable of informing the operator of this through the display means.

Further, according to the arrangement of the embodiment, when the initially vacant code is used for newly setting some information or when some of the codes is changed or updated, the embodiment is capable of setting decoded information in conformity to the change. Therefore, when a film of a new kind comes to be added to the group of usable films in the future, photographing can be normally carried out.

The individual components shown in schematic or block form in the drawings are all well known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The embodiments described are arranged to inhibit the film from being sent out from the cartridge when a demonstration film cartridge or the like is loaded. This arrangement may be replaced with some other suitable restrictive method. For example, the film sending action may be allowed to be performed only for a predetermined short period of time, instead of completely inhibiting the film sending action.

The embodiments described are arranged to inhibit any photographing action in a case where a film cartridge or the like which has some index inhibited as a cartridge index is loaded. That arrangement may be replaced with some other suitable restrictive method. For example, the inhibition of photographing may be arranged to permit cancellation of it by a manual operation, instead of completely inhibiting the photographing action.

This invention is applicable also to image recording media other than a film.

This invention is applicable to a cartridge of a type other than the type of the cartridge described in the foregoing description of embodiments, to a cartridge containing an image recording medium other than a film, to cartridges of other kinds and also to other things which are not cartridges but are arranged to be also loaded and unloaded, such as a battery or the like.

The software arrangement and the hardware arrangement of the embodiments described in the foregoing are interchangeable with each other as desired.

This invention may be carried out by combining as necessary the embodiments or their technological elements described in the foregoing.

This invention applies to cases where either the whole or a part of claims or the arrangement of each embodiment described forms one apparatus or is used in combination with some other apparatus or as a component element of an apparatus.

Further this invention is applicable to cameras of varied kinds, such as a single-lens reflex camera, a lens-shutter type camera, a video camera, etc., optical apparatuses other than cameras, devices adapted for cameras, optical apparatuses and other apparatuses, and components elements forming these apparatuses and devices.

What is claimed is:

1. A camera comprising:
   a) a detection device which detects whether a cartridge in use is a cartridge for demonstration; and
   b) a control device which restrains a film thrusting action in accordance with said detection device detecting that the cartridge in use is the cartridge for demonstration.

2. A camera according to claim 1, wherein said detection device includes a reading device which reads an index interlocked with a film transport spool provided in the cartridge in use so as to detect whether the cartridge in use is the cartridge for demonstration.

3. A camera comprising:
   a) a detection device which detects whether a cartridge in use is a cartridge for demonstration; and
   b) a control device which restrains a one-frame transporting action after photography in accordance with said detection device detecting that the cartridge in use is the cartridge for demonstration.

4. A camera according to claim 3, wherein said detection device includes a reading device which reads an index interlocked with a film transport spool provided in the cartridge in use so as to detect whether the cartridge in use is the cartridge for demonstration.

5. A camera comprising:
   a) a detection device which detects whether a cartridge in use is a cartridge for demonstration; and
   b) a control device which restrains a film rewinding action in accordance with said detection device detecting that the cartridge in use is the cartridge for demonstration.

6. A camera according to claim 5, wherein said detection device includes a reading device which reads an index interlocked with a film transport spool provided in the cartridge in use so as to detect whether the cartridge in use is the cartridge for demonstration.

7. A camera comprising:
   a) a detection device which detects whether a cartridge in use is a cartridge for demonstration; and
   b) a control device which allows a photographing action, while restraining a film thrusting action, in accordance with said detection device detecting that the cartridge in use is the cartridge for demonstration.

8. A camera according to claim 7, wherein said detection device includes a reading device which reads an index interlocked with a film transport spool provided in the cartridge in use so as to detect whether the cartridge in use is the cartridge for demonstration.

9. A camera comprising:
   a) a detection device which detects whether a cartridge in use is a cartridge for demonstration; and
   b) a control device which performs control corresponding to using a high sensitivity film, in accordance with said detection device detecting that the cartridge in use is the cartridge for demonstration.

10. A camera according to claim 9, wherein said detection device includes a reading device which reads an index interlocked with a film transport spool provided in the cartridge in use so as to detect whether the cartridge in use is the cartridge for demonstration.

11. A camera comprising:
    a) a detection device which detects whether a cartridge in use is a cartridge for demonstration;
    b) a display device; and
    a control device causing said display device to provide a display corresponding to the cartridge for demonstration, in accordance with said detection device detecting that the cartridge in use is the cartridge for demonstration.

12. A camera according to claim 11, wherein said detection device includes a reading device which reads an index interlocked with a film transport spool provided in the cartridge in use so as to detect whether the cartridge in use is the cartridge for demonstration.

13. A camera comprising:
    a) a detection device which detects whether a cartridge in use is a cartridge for demonstration; and
    b) a control device, which determines from an index of the cartridge in use, whether or not a film of the cartridge in use has been completely used for photography, and inhibiting a photographing action when determining that the film has been completely used for photography, and for allowing the photographing action, in accordance with said detection device detecting that the cartridge in use is the cartridge for demonstration, even if said index indicates that the film of the cartridge in use has been completely used for photography.

14. A camera according to claim 13, wherein said detection device includes a reading device which reads an index interlocked with a film transport spool provided in the cartridge in use so as to detect whether the cartridge in use is the cartridge for demonstration.

15. A camera comprising:
    a) a detection device which detects whether a cartridge in use is a cartridge for demonstration; and
    b) a control device which sets an index of the cartridge for demonstration to an unexposed state even after a photographing action has been performed in accordance with said detection device detecting that the cartridge in use is the cartridge for demonstration.

16. A camera according to claim 15, wherein said control device sets said index to an unexposed state immediately after the cartridge for demonstration is loaded, in accordance with said detection device detecting that the cartridge in use is the cartridge for demonstration.

17. A camera according to claim 15, wherein said detection device includes a reading device which reads an index interlocked with a film transport spool provided in the cartridge in use so as to detect whether the cartridge in use is the cartridge for demonstration.

18. A camera adapted to use a cartridge with an index comprising:
a) a detection device which detects the index of the cartridge; and
b) a control device which performs predetermined control in accordance with determining that the index of the cartridge detected by said detecting device is a predetermined index which does not exist in film cartridges for photography but is different from an inhibited index.

19. A camera according to claim 18, wherein said control device performs the predetermined control in accordance with determining that said predetermined index is an index indicating a cartridge for demonstration.

20. A camera according to claim 18, wherein said control device performs the predetermined control in accordance with determining that said predetermined index is an undefined index.

21. A camera according to claim 20, wherein said control device performs predetermined control in accordance with determining that the index of the cartridge detected by said detecting device is the inhibited index.

22. A camera according to claim 18, wherein said control device inhibits a photographing action in accordance with determining that the index of the cartridge detected by said detection device is the inhibited index, and allows the photographing action in accordance with determining that the index of the cartridge detected by said detection device is an undefined index.

23. A camera according to claim 18, wherein said control device inhibits a film thrusting action in accordance with determining that the index of the cartridge detected by said detection device is the inhibited index, and allows the film thrusting action in accordance with determining that the index of the cartridge detected by said detection device is an undefined index.

24. A camera according to claim 18, further comprising:
a display device, and
wherein said control device causes said display device to give warning in accordance with determining that the index of the cartridge detected by said detection device is the inhibited index, and causes said display device not to give warning in accordance with determining that the index of the cartridge detected by said detection device is an undefined index.

25. A camera according to claim 18, wherein said control device performs predetermined control in accordance with determining that the index of the cartridge detected by said detecting device is the inhibited index.

26. A camera according to claim 18, wherein said control device restricts a photographing action in accordance with determining that the index of the cartridge detected by said detecting device is the inhibited index.

27. A camera according to claim 18, wherein said control device restricts a film thrusting action in accordance with determining that the index of the cartridge detected by said detecting device is the inhibited index.

28. A camera according to claim 18, further comprising:
a display device, and
wherein said control device causes said display device to give warning in accordance with determining that the index of the cartridge detected by said detecting device is the inhibited index.

29. An apparatus comprising:
a) a detection device which detects whether or not a cartridge in use is a cartridge for demonstration; and
b) a control device which restrains an image-recording medium thrusting action in accordance with said detection device detecting that the cartridge in use is the cartridge for demonstration.

30. An apparatus adapted to use a cartridge with an index comprising:
a) a detection device which detects the index of the cartridge; and
b) a control device which performs predetermined control in accordance with determining that the index of the cartridge detected by said detecting device is a predetermined index which does not exist in image recording medium cartridges for photography but is different from an inhibited index.

31. An apparatus according to claim 30, wherein said control device performs the predetermined control in accordance with determining that said predetermined index is an index indicating a cartridge for demonstration.

32. An apparatus according to claim 30, further comprising:
a display device, and
wherein said control device includes causes said display device to give warning in accordance with determining that the index of the cartridge detected by said detecting device is the inhibited index.

33. An apparatus according to claim 30, wherein said control device performs predetermined control in accordance with determining that said predetermined index is an undefined index.

34. An apparatus according to claim 33, wherein said control device performs predetermined control in accordance with determining that the index of the cartridge detected by said detecting device is the inhibited index.

35. An apparatus according to claim 30, wherein said control device inhibits a photographing action in accordance with determining that the index of the cartridge detected by said detection device is the inhibited index, and allows the photographing action in accordance with determining that the index of the cartridge detected by said detection device is an undefined index.

36. An apparatus according to claim 30, wherein said control device inhibits a image recording medium thrusting action in accordance with determining that the index of the cartridge detected by said detection device is the inhibited index, and allows the image recording medium thrusting action in accordance with determining that the index of the cartridge detected by said detection device is an undefined index.

37. An apparatus according to claim 30, further comprising:
a display device, and
wherein said control device causes said display device to give warning in accordance with determining that the index of the cartridge detected by said detection device is the inhibited index, and causes said display device not to give warning in accordance with determining that the index of the cartridge detected by said detection device is an undefined index.

38. An apparatus according to claim 30, wherein said control device performs predetermined control in accordance with determining that the index of the cartridge detected by said detecting device is the inhibited index.

39. An apparatus according to claim 30, wherein said control device restricts a photographing action in accordance with determining that the index of the cartridge detected by said detecting device is the inhibited index.

40. An apparatus according to claim 30, wherein said control device restricts a image recording medium thrusting action in accordance with determining that the index of the cartridge detected by said detecting device is the inhibited index.

41. An apparatus comprising:
   a) a detection device which detects whether a cartridge in use is a cartridge for demonstration; and
   b) a control device which restrains a one-frame transporting action after photography in accordance with said detection device detecting that the cartridge in use is the cartridge for demonstration.

42. An apparatus according to claim 41, wherein said detection device includes a reading device which reads an index interlocked with a image recording medium transport spool provided in the cartridge in use so as to detect whether the cartridge in use is the cartridge for demonstration.

43. An apparatus comprising:
   a) a detection device which detects whether a cartridge in use is a cartridge for demonstration; and
   b) a control device which restrains a image recording medium rewinding action in accordance with said detection device detecting that the cartridge in use is the cartridge for demonstration.

44. An apparatus according to claim 43, wherein said detection device includes a reading device which reads an index interlocked with a image recording medium transport spool provided in the cartridge in use so as to detect whether the cartridge in use is the cartridge for demonstration.

45. An apparatus comprising:
   a) a detection device which detects whether a cartridge in use is a cartridge for demonstration; and
   b) a control device which allows a photographing action, while restraining a image recording medium transporting action, in accordance with said detection device detecting that the cartridge in use is the cartridge for demonstration.

46. An apparatus according to claim 45, wherein said detection device includes a reading device which reads an index interlocked with a image recording medium transport spool provided in the cartridge in use so as to detect whether the cartridge in use is the cartridge for demonstration.

47. An apparatus comprising:
   a) a detection device which detects whether a cartridge in use is a cartridge for demonstration; and
   b) a control device which performs control corresponding to using a high sensitivity image recording medium, in accordance with said detection device detecting that the cartridge in use is the cartridge for demonstration.

48. An apparatus according to claim 47, wherein said detection device includes a reading device which reads an index interlocked with a image recording medium transport spool provided in the cartridge in use so as to detect whether the cartridge in use is the cartridge for demonstration.

49. An apparatus comprising:
   a) a detection device which detects whether a cartridge in use is a cartridge for demonstration;
   b) a display device; and
   c) a control device causing said display device to provide a display corresponding to the cartridge for demonstration, in accordance with said detection device detecting that the cartridge in use is the cartridge for demonstration.

50. An apparatus according to claim 49, wherein said detection device includes a reading device which reads an index interlocked with a image recording medium transport spool provided in the cartridge in use so as to detect whether the cartridge in use is the cartridge for demonstration.

51. An apparatus comprising:
   a) a detection device which detects whether a cartridge in use is a cartridge for demonstration; and
   b) a control device, which determines from an index of the cartridge in use, whether or not a image recording medium of the cartridge in use has been completely used for photography, and inhibiting a photographing action when determining that the image recording medium has been completely used for photography, and for allowing the photographing action, in accordance with said detection device detecting that the cartridge in use is the cartridge for demonstration, even if said index indicates that the image recording medium of the cartridge in use has been completely used for photography.

52. An apparatus according to claim 51, wherein said detection device includes a reading device which reads an index interlocked with a image recording medium transport spool provided in the cartridge in use so as to detect whether the cartridge in use is the cartridge for demonstration.

53. An apparatus comprising:
   a) a detection device which detects whether a cartridge in use is a cartridge for demonstration; and
   b) a control device which sets an index of the cartridge for demonstration to an unexposed state even after a photographing action has been performed, in accordance with said detection device detecting that the cartridge in use is the cartridge for demonstration.

54. An apparatus according to claim 53, wherein said control device sets said index to an unexposed state immediately after the cartridge for demonstration is loaded, in accordance with said detection device detecting that the cartridge in use is the cartridge for demonstration.

55. An apparatus according to claim 53, wherein said detection device includes a reading device which reads an index interlocked with a image recording medium transport spool provided in the cartridge in use so as to detect whether the cartridge in use is the cartridge for demonstration.

* * * * *

UNITED STATES PATENT AND TRADEMARK OFFICE
CERTIFICATE OF CORRECTION

PATENT NO. : 6,026,248
DATED : February 15, 2000
INVENTOR(S) : Masao Shikaumi, et al.

It is certified that error appears in the above-identified patent and that said Letters Patent are hereby corrected as shown below:

Col. 2, lines 17-18, delete "a film rewinding action and" and insert -- and a film rewinding action --.
Col. 5, line 10, delete "0." and insert -- 0 (undefined index). --.
Col. 13, line 13, before "at" delete -- I --.
Col. 17, line 45, delete "thee" and insert -- the --.
Col. 23, line 10, delete "Ti" and insert -- T1 --.
Col. 24, line 46, after "start" delete -- 60 --.
Col. 24, line 65, delete "TIS" and insert -- T15 --.
Col. 27, line 1, delete "S1is" and insert -- S1 is --.

Signed and Sealed this

Seventeenth Day of April, 2001

Attest:

NICHOLAS P. GODICI

*Attesting Officer*     *Acting Director of the United States Patent and Trademark Office*